United States Patent [19]
Yanagisawa

[11] Patent Number: 5,638,189
[45] Date of Patent: Jun. 10, 1997

[54] RASTER SCANNER, MIRROR SUPPORTING STRUCTURE OF THE SAME AND METHOD FOR ADJUSTING MIRROR ANGLE USING THE STRUCTURE

[75] Inventor: Katsuyuki Yanagisawa, Ebina, Japan

[73] Assignee: Fuji Xerox Co., Ltd., Tokyo, Japan

[21] Appl. No.: 447,961

[22] Filed: May 23, 1995

Related U.S. Application Data

[63] Continuation of Ser. No. 189,994, Feb. 1, 1994, abandoned, which is a continuation of Ser. No. 816,232, Jan. 3, 1992, abandoned.

[30] Foreign Application Priority Data

Jan. 28, 1991 [JP] Japan ..................................... 3-026906
Jan. 28, 1991 [JP] Japan ..................................... 3-026907

[51] Int. Cl.$^6$ ............................................... H04N 1/04
[52] U.S. Cl. .......................... 358/481; 358/474; 358/494; 250/216; 250/234; 359/212
[58] Field of Search ........................ 358/481, 480, 358/474, 494, 496; 250/216, 234, 235, 236; 359/212, 216

[56] References Cited

U.S. PATENT DOCUMENTS

| | | | |
|---|---|---|---|
| 4,050,780 | 9/1977 | Wei et al. | 250/234 |
| 4,651,169 | 3/1987 | Muka | 358/481 |
| 4,918,306 | 4/1990 | Saito | 250/235 |
| 5,132,833 | 7/1992 | Diau | 359/212 |

FOREIGN PATENT DOCUMENTS

| | | |
|---|---|---|
| 62-23014 | 7/1960 | Japan . |
| 63-55520 | 8/1986 | Japan . |
| 64-37525 | 8/1987 | Japan . |

OTHER PUBLICATIONS

English Abstract of JP 63-55520 "Device for Adjusting Optical Axis of Optical System in Copying Machine or the Like."

*Primary Examiner*—Edward L. Coles, Sr.
*Assistant Examiner*—Thomas D. Lee
*Attorney, Agent, or Firm*—Finnegan, Henderson, Farabow, Garrett & Dunner, L.L.P.

[57] ABSTRACT

A raster scanner characterized in that at least one reflecting mirror is supported by a movable supporting mechanism in a manner capable of moving along an incident optical axis while being kept in a certain angle attitude or that an optical sub-frame provided with a beam generating means, a beam deflecting means and an imaging lens is supported by a movable supporting mechanism in a manner capable of moving along an output optical axis while being kept in a certain angle attitude to be able to avoid assuredly an occurrence of unbalance in image widths in the main scan direction at both ends of the image when length of optical path is adjusted. This invention also presupposes that the reflecting mirror is a cylindrical mirror. Angle adjusting performance of the cylindrical mirror is kept in good condition by rotating one end portion of the cylindrical mirror following to a rotation of the other end portion of the same centering on an axis parallel to a generating line of the cylindrical mirror. It also allows to correct inclination of the cylindrical mirror itself caused due to precision of the parts assuredly by minutely rotating one end portion of the cylindrical mirror while securing the other end portion of the same.

13 Claims, 21 Drawing Sheets

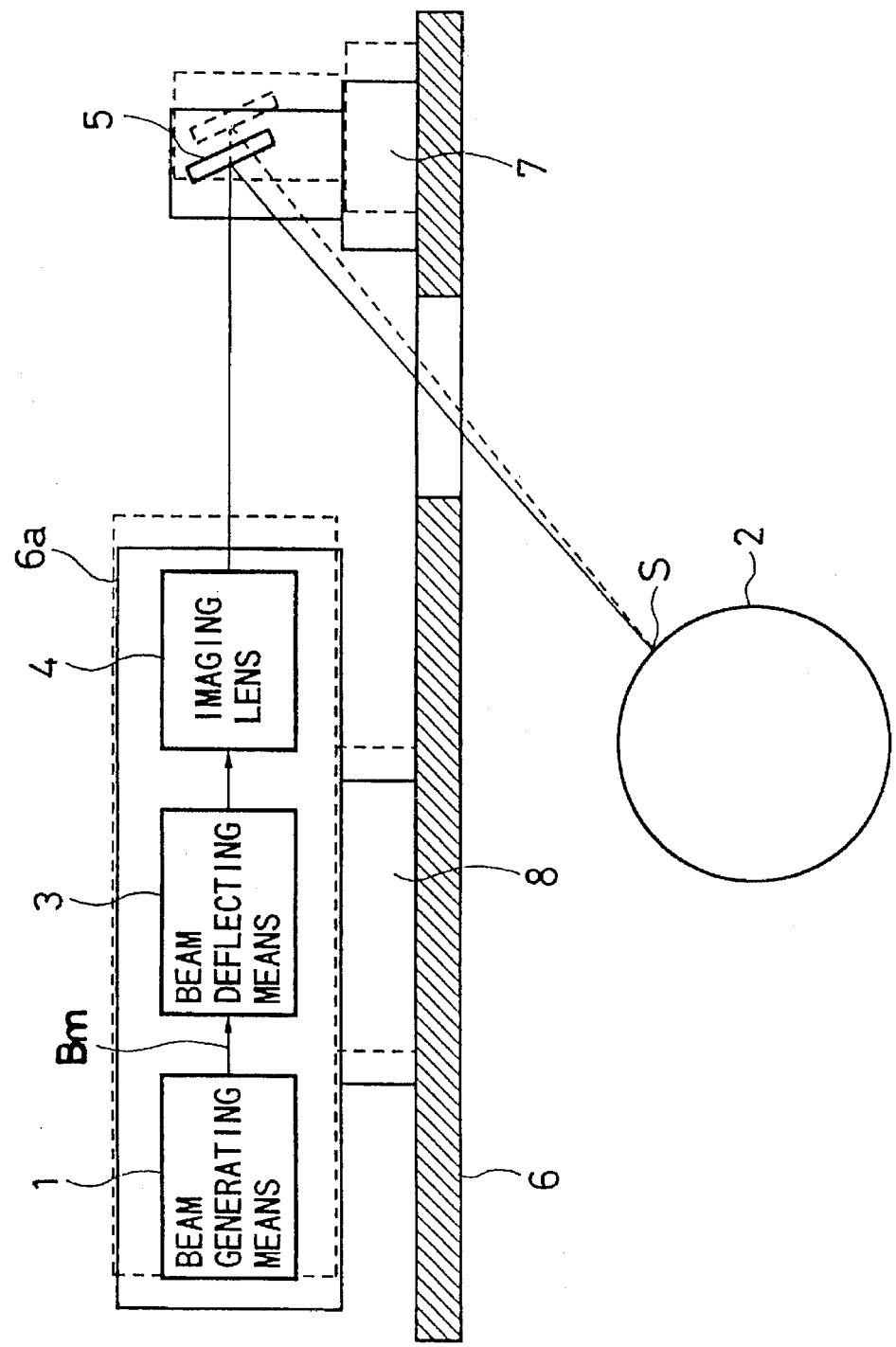

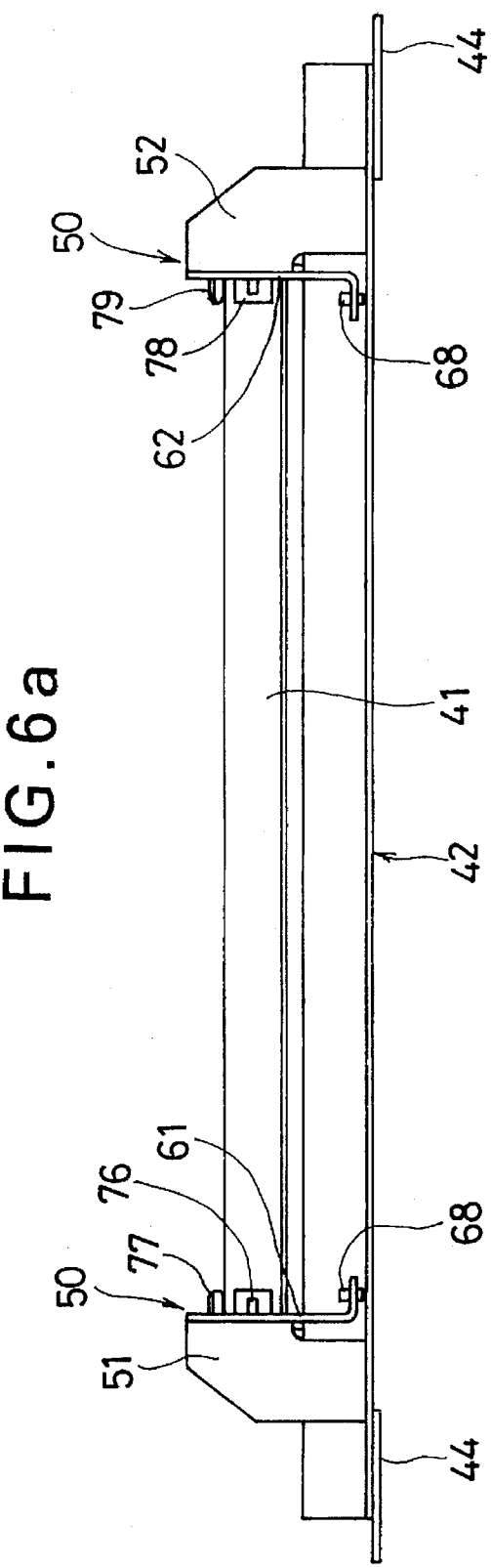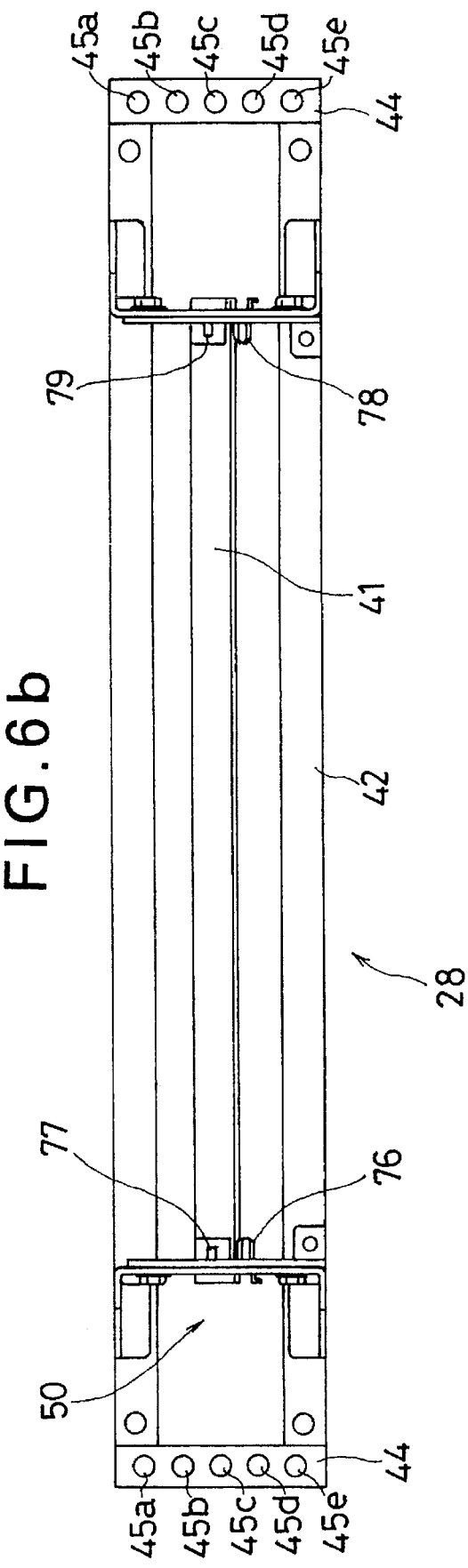

FIG. 7
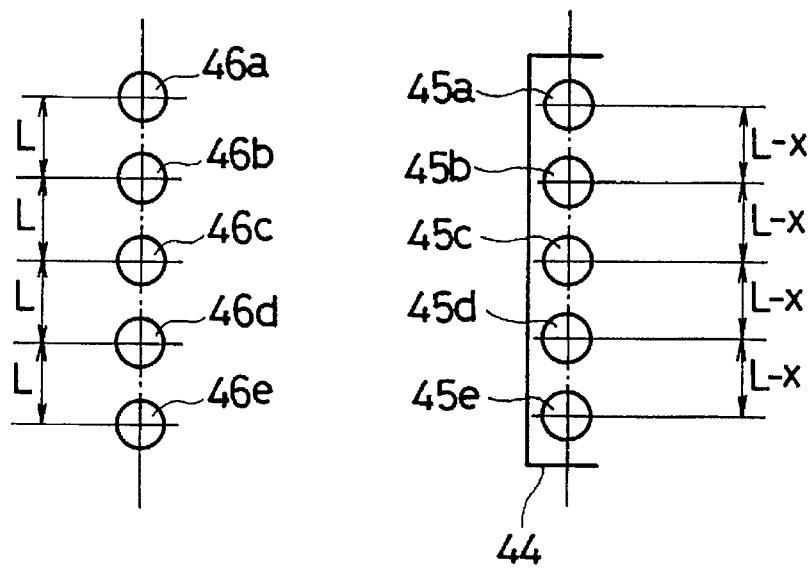
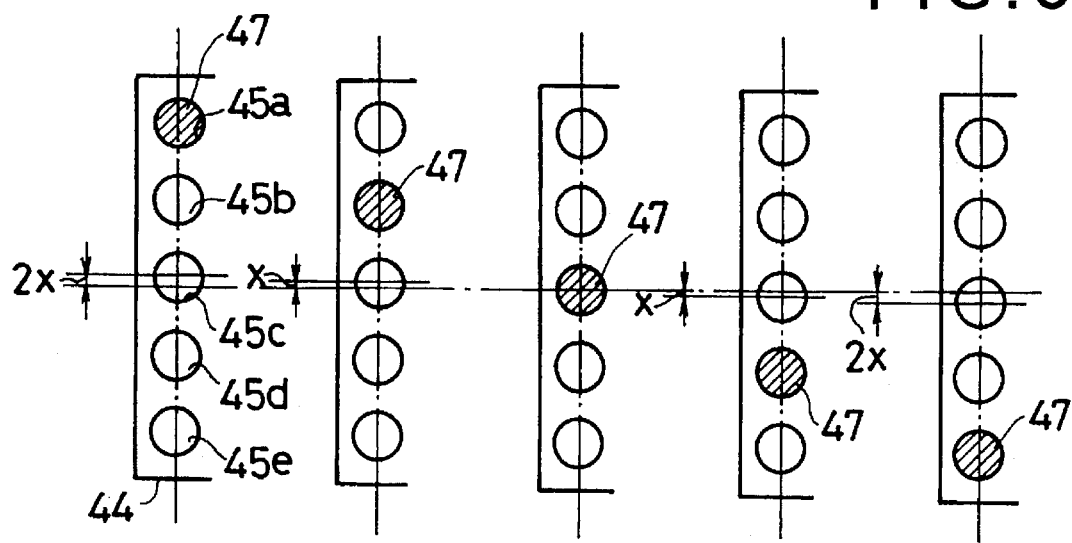

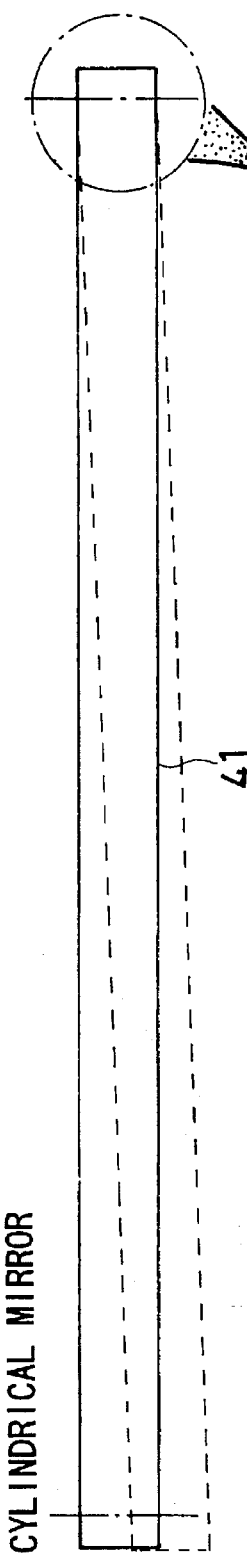
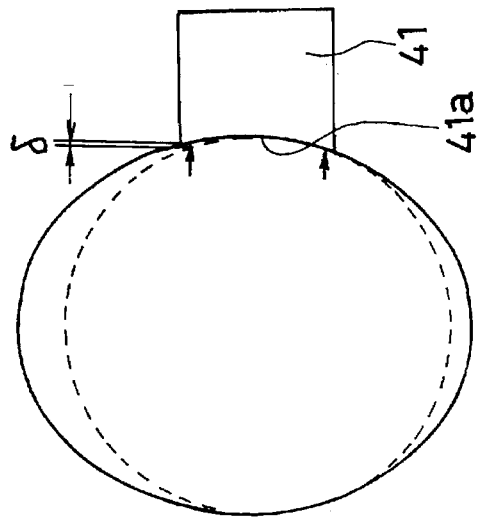
FIG.12a
ONE-POINT SUPPORT SIDE OF THE REFLECTING SURFACE OF THE CYLINDRICAL MIRROR
TWO-POINT SUPPORT SIDE OF THE REFLECTING SURFACE OF THE CYLINDRICAL MIRROR
FIG.12b

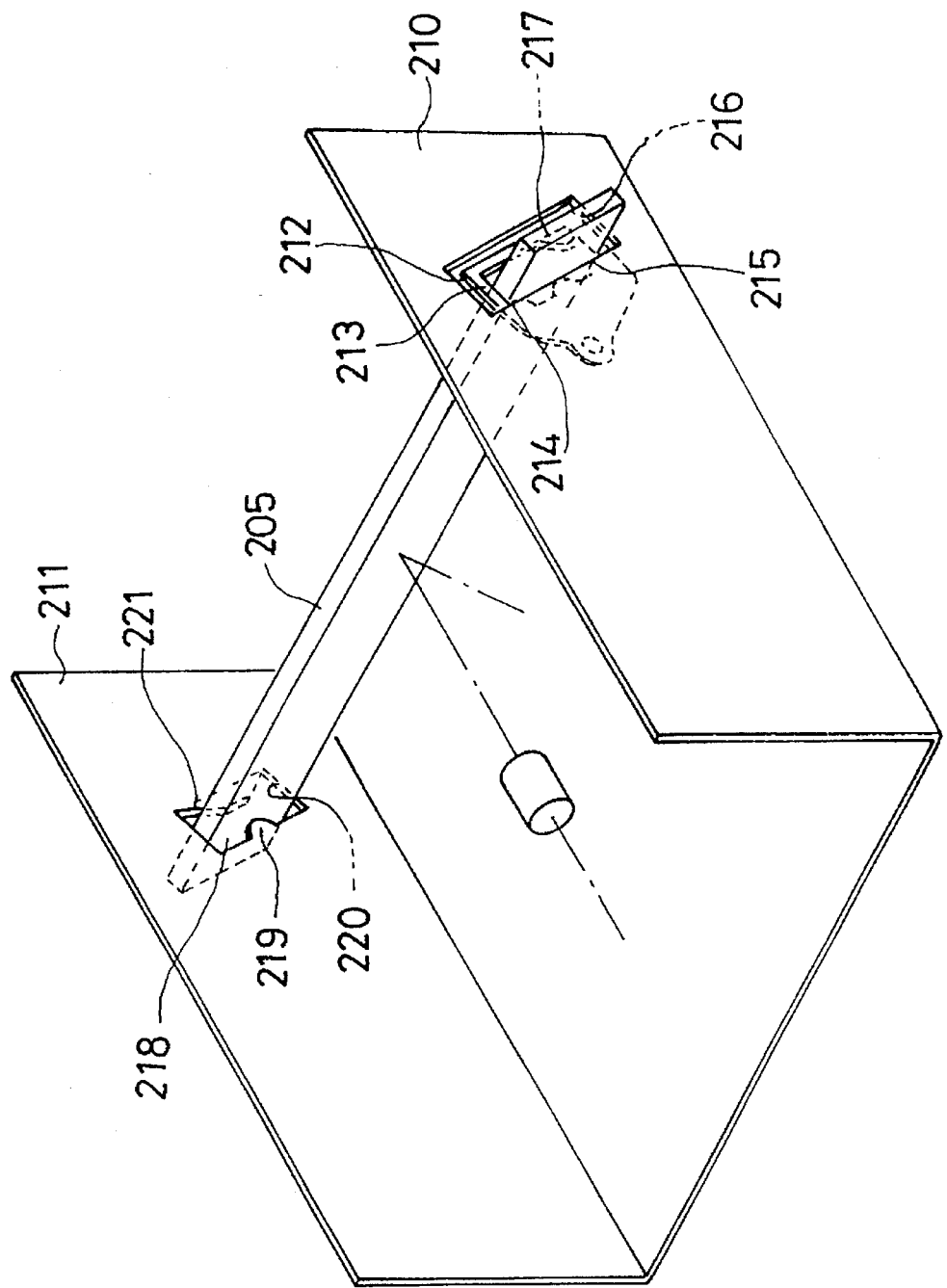

RASTER SCANNER, MIRROR SUPPORTING STRUCTURE OF THE SAME AND METHOD FOR ADJUSTING MIRROR ANGLE USING THE STRUCTURE

This application is a continuation of application Ser. No. 08/189,994 filed Feb. 1, 1994, which is a continuation of application Ser. No. 07/816,232, filed Jan. 3, 1992, both now abandoned.

BACKGROUND OF THE INVENTION

1. Field of the Invention

The present invention relates to a raster scanner for scanning a photosensitizer by moving a beam from a beam generating means along the main scanning direction of the photosensitizer and more particularly to improvements of the raster scanner in which a mechanism for adjusting length of a beam path between the beam generating means and the photosensitizer is provided, to a mirror supporting structure which is effective in a type of raster scanner that contains a cylindrical mirror in its beam path and to a method for adjusting angle of the mirror using the mirror supporting structure.

2. Description of the Related Art

A laser scanner used for laser printers and others is a typical raster scanner. As shown in FIGS. 20a and 20b, it is comprised of various parts such as a semiconductor laser 201 for irradiating beam Bm in accordance to image signals, a polygon mirror 202 for directing the beam Bm from the semiconductor laser 201 across a certain scanning range, an imaging lens 204 for imaging adequately the beam Bm from the polygon mirror 202 along the main scan line on a photosensitive drum 203 and a reflecting mirror 205 for guiding the beam Bm directed by the polygon mirror 202 to the photosensitive drum 203 side. In order to keep good precision in scanned position on the photosensitive drum 203, the aforementioned various parts are positioned accurately through intermediary of an optical sub-frame 206 or directly on an optical frame (not shown).

However, dispersions of precision are caused among those parts when they are manufactured and when they are mounted, so that various adjustments are required to absorb those dispersions of precision. One of the adjustments is adjustment of length of optical path, by which a distance from the polygon mirror 202 to the photosensitive drum 203 or that from the imaging lens 204 to the photosensitive drum 203 is adjusted to adjust an exposing width (actual scan range in the scan direction) to a specified time.

By the way, as a prior art optical path adjustment method, there is, for example, a type in which the reflecting mirror 205 is supported by variably adjustable three supporting points as a supporting mechanism of the reflecting mirror 205. In that type, position of the reflecting surface of the reflecting mirror 205 is moved in the optical axis direction to variably adjust the length of the optical path by variably adjusting position of each supporting point. When quality of output image of a laser printer whose optical path was adjusted by this type of optical path adjusting method was examined, however, a technological problem was found that unbalance is apt to be caused in the image width in the main scan direction at the both ends of the image.

On the other hand, as a prior art method for adjusting angle of a reflecting mirror, Japanese Patent Laid-open No. 63-55520, for example, is disclosed. This is characterized in that, as shown in FIG. 21, a rotary supporting plate 212 is rotatably mounted on one side of a pair of securing plates 210 and 211, a hole 213 for inserting the reflecting mirror 205 is opened on the rotary supporting plate 212, supporting points 214 and 215 for supporting the reflecting surface of the reflecting mirror 205 at two points and a supporting point 216 for supporting the bottom side surface of the reflecting mirror 205 are created on the edge portion of the mirror inserting hole 213 and the reflecting mirror 205 is urged to each supporting point by a plate spring 217. A mirror inserting hole 218 is opened also on the other securing plate 211, a supporting point 219 for supporting the reflecting surface of the reflecting mirror 205 at one point and a supporting point 220 for supporting the bottom side surface of the reflecting mirror 205 are created on the edge portion of the mirror inserting hole 218 and the reflecting mirror 205 is urged to each supporting point by a plate spring 221.

According to this type of method, when the one rotary supporting plate 212 is rotated appropriately, one end of the reflecting mirror 205 rotates following to that and the other end of the reflecting mirror 205 rotates by a certain angle pivoting on the supporting point 218. Thereby the reflecting mirror 205 is adjusted to the certain angle.

By the way, in order to correct an inclination of mirror surface of the polygon mirror 202, a cylindrical mirror, for example, is used as the reflecting mirror 205. When using a cylindrical mirror, however, its generating line has to be kept in parallel, differing from a plane mirror, and normally a measure for preventing the cylindrical mirror from rising up needs to be taken by providing plate springs for pressing the cylindrical mirror downward.

When the angle of the cylindrical mirror was adjusted by this type of method, however, a new technological problem was found that the generating line of the cylindrical mirror inclines, which damages the performance for adjusting the angle of the cylindrical mirror.

SUMMARY OF THE INVENTION

Accordingly, a first object of the present invention is to provide a raster scanner which allows to eliminate a situation in which moving direction of a reflecting mirror 205 and others deviate from an optical axis direction, as shown in FIG. 20b, and to avoid unbalance to be caused in image width in the main scan direction at both ends of the image when length of the optical path is adjusted by changing position of the reflecting mirror 205 and an imaging lens 204.

A second object of the invention presupposes a type of raster scanner in which a cylindrical mirror is used as the reflecting mirror 205 and provides a mirror supporting structure for the raster scanner which can keep a good angle adjusting performance for the cylindrical mirror, and further provides a method for adjusting angle of a mirror of a raster scanner which also allows to assuredly correct inclination of generating line of the cylindrical mirror itself caused by precision of parts and others.

At first, summary of the present invention for achieving the first object will be explained. A first invention for achieving the first object presupposes a raster scanner comprising, as shown in FIG. 1a, a beam generating means 1 for generating beam Bm in accordance to image signals, a beam deflecting means 3 for deflecting and scanning the beam Bm from the beam generating means 1 across the main scan direction of a photosensitizer 2, an imaging lens 4 for imaging the beam Bm deflected by the beam deflecting means 3 on the main scan line position S on the photosensitizer 2, at least one reflecting mirror 5 for regulating an optical path between the beam deflecting means 3 and the photosensitizer 2, and an optical frame 6 for positioning each aforementioned part; and is characterized in that at least one reflecting mirror 5 is supported by a movable supporting mechanism 7 in a manner capable of moving along an incident optical path while being maintained in a certain angle attitude.

A second invention for achieving the first object presupposes a raster scanner comprising also, as shown in FIG. 1a, a beam generating means 1, a beam deflecting means 3, an imaging lens 4, at least one reflecting mirror 5, and an optical frame 6; and is characterized in that an optical sub-frame 6a provided with the beam generating means 1, the beam deflecting means 3 and the imaging lens 4 is supported by a movable supporting mechanism 8 in a manner capable of moving along an output optical axis while being maintained in a certain angle attitude.

Furthermore, a third invention for achieving the first object of the invention presupposes a raster scanner comprising also, as shown in FIG. 1a, a beam generating means 1, a beam deflecting means 3, an imaging lens 4, at least one reflecting mirror 5, and an optical frame 6; and is characterized in that at least one reflecting mirror 5 is supported by a movable supporting mechanism 7 in a manner capable of moving along an incident optical path while being maintained in a certain angle attitude and an optical sub-frame 6a provided with the beam generating means 1, the beam deflecting means 3 and the imaging lens 4 is supported by a movable supporting mechanism 8 in a manner capable of moving along an output optical axis while being maintained in a certain angle attitude.

In such technological means, the beam generating means 1 may be appropriately selected from laser, liquid crystal shutter, LED and the like so long as it can generate beam Bm in accordance to image signals. At this time, it may be one that irradiates beam Bm in correspondence with an imaging part or one that irradiates beam Bm in correspondence with a background part other than the imaging part.

The beam deflection means 3 also may be selected appropriately from polygon mirror, galvano-mirror and the like so long as it deflects beam Bm from the beam generating means 1 and for the imaging lens 4, its design such as its structure, the number of lenses and the like may be changed appropriately so long as it allows to obtain a certain imaging characteristic.

Furthermore, design of the structure, number and layout of the reflecting mirror 5 may be changed appropriately in a range in which a certain optical path length can be obtained. At this time, there is a possibility that scanning position of the beam Bm deviates due to an inclination of a deflecting surface of the beam deflecting means 3, so that it is desirable, from the standpoint of preventing it, to design so as to provide a means for correcting the inclination of the deflecting surface of the beam deflecting means 3 within the path of the beam Bm (for example, a cylindrical mirror or a cylindrical lens as one of the reflecting mirror 5).

Moreover, as for the structure of the optical frame 6 and the optical sub-frame 6a, their design may be changed appropriately so long as they have parts for positioning various parts provided and can secure those parts at each positioning part.

For the movable supporting mechanism 7 of the reflecting mirror 5, its design may be changed appropriately so long as it can move the reflecting mirror 5 along the incident optical axis direction, but considering that normally the reflecting mirror 5 is long in the direction that is orthogonal to the incident optical axis, it is desirable to design the movable supporting mechanism 7 so that it assuredly regulate the moving direction of the reflecting mirror 5, by providing, for example, a pair of positioning members that extend in the incident optical path direction at both ends of the reflecting mirror 5. It is also desirable to adopt a structure in which movement of the reflecting mirror 5 is uniquely set in accordance to position of, for example, a positioning pin in order to be able to readily adjust the movement of the reflecting mirror 5.

For the movable supporting mechanism 8 of the optical sub-frame 6a, its design may be changed appropriately so long as it can move the optical sub-frame 6a along the output optical axis, but it is desirable to design, for example, so as to lengthen an interval of two positioning pins that determine the direction of the optical sub-frame 6a in order to move it accurately in the direction of the output optical axis.

According to each invention aforementioned for achieving the first object, the movable supporting mechanism 7 moves the reflecting mirror 5 along the incident optical axis while keeping the angle attitude of the reflecting mirror 5, so that the length of the optical path from the beam deflecting means 3 or the imaging lens 4 to the photosensitizer 2 can be changed without changing the direction of reflection beam Bm reflected by the reflecting mirror 5. However, the angle of the reflecting mirror 5 may need to be adjusted to keep appropriate incident position to the photosensitizer 2, depending on the movement along the incident optical axis and the set angle of the reflecting mirror 5.

Moreover, the movable supporting mechanism 8 moves the optical sub-frame 6a along the output optical axis while keeping the angle attitude of the optical sub-frame 6a, so that the length of the optical path from the beam deflecting means 3 or the imaging lens 4 to the photosensitizer 2 can be changed without changing the direction of the output Bm from the optical sub-frame 6a.

Therefore, according to each invention aforementioned for achieving the first object, the reflecting mirror or the optical sub-frame is moved along the beam incident direction or the beam output direction while being kept in a certain angle attitude, so that the length of the optical path from the beam deflecting means or the imaging lens to the photosensitizer can be variably set while assuredly avoiding deviation of the beam path in adjusting the length of the optical path.

Moreover, according to the second invention for achieving the first object, the beam incident position to the photosensitizer is not changed even if the optical sub-frame is moved along the beam output direction, so that the length of the optical path can be simply adjusted without having to adjust the angle of the optical sub-frame at all.

Furthermore, according to the third invention for achieving the first object, the reflecting mirror and the optical sub-frame are moved respectively along the beam incident direction or the beam output direction while being kept in a certain angle attitude, so that if the length of the optical path has been adjusted in unit of each sub-assembly of the reflecting mirror sub-assembly and the optical sub-assembly, the length of the optical path needs not be adjusted even when each sub-assembly is replaced independently.

Next, summary of the invention for achieving the second object will be explained.

The invention for achieving the second object is a mirror supporting structure that is used for and presupposes a raster scanner comprising, as shown in FIG. 1b, a beam generating means 1 such as a laser, LC shutter, LED and the like for generating beam Bm in accordance to image signal, a beam deflecting means 3 such as a polygon mirror and galvanomirror for deflecting and scanning the beam Bm from the beam generating means 1 across the main scan direction of a photosensitizer 2, an imaging lens 4 for imaging the beam Bm deflected by the beam deflecting means 3 on the main scan line position S on the photosensitizer 2, and a cylindrical mirror 5 interposed on the optical path between the beam deflecting means 3 and the photosensitizer 2 for correcting inclination of deflecting surface of the beam deflecting means 3; and is characterized in that a mirror angle adjusting means for turning the cylindrical mirror 5 centering on an axis parallel to a generating line of the cylindrical mirror 5 is provided.

In this invention, the mirror angle adjusting means is structured, as shown in FIG. 1b for example, by rotatably mounting rotary supporting members 12 and 13 having a center of rotation Q which is parallel to the generating line of the cylindrical mirror 5 to fixed frames 11 which are located at both ends of the cylindrical mirror 5, by creating supporting projections 14a and 14b for supporting the reflecting surface of the cylindrical mirror 5 at two points and a supporting projection 14c for supporting the bottom side surface of the cylindrical mirror 5 that is orthogonal to the reflecting surface of the same at one point at a mirror inserting hole 12a of one of the rotary supporting member 12, by pressing each surface to be supported of the cylindrical mirror 5 to each supporting projection 14a, 14b and 14c by an elastic member 15a, by creating another supporting projection 14d for supporting the reflecting surface of the cylindrical mirror 5 at one point and still another supporting projection 14e for supporting the bottom side surface of the cylindrical mirror 5 that is orthogonal to the reflecting surface of the same at one point at a mirror inserting hole 13a of another rotary supporting member 13, and by pressing each surface to be supported of the cylindrical mirror 5 to each supporting projection 14d and 14e by another elastic member 15b to secure each rotary supporting member 12 and 13 to the fixed frames 11 in a desired attitude by securing members 16 and 17.

To control the angle of the cylindrical mirror 5 using such mirror supporting structure, one of the rotary supporting member 12 is secured to the fixed frame 11 by the securing member 16 after rotating to a desired angle position and then, when the generating line of the cylindrical mirror 5 is inclined from the datum line, the other rotary supporting member 13 is minutely rotated to cause the generating line of the cylindrical mirror 5 to agree to the datum line and the rotary supporting member 13 is secured to the fixed frame 11 by the securing member 17.

According to the aforementioned invention for achieving the second object, when one of the rotary supporting member 12 is rotated to a desired angle position, one end of the cylindrical mirror 5 rotates together with the rotary supporting member 12 and following to that, the other end of the cylindrical mirror 5 rotates in one body with the other rotary supporting member 13. Therefore, the angle attitude of the both ends of the cylindrical mirror 5 always agree and by securing them by the securing members 16 and 17 when the angle attitude of the cylindrical mirror 5 has reached to the certain angle, the adjustment of the angle of the cylindrical mirror 5 is then completed.

Accordingly, the other end of the cylindrical mirror can be rotated following to the rotation of one end of the same centering on the axis parallel to the generating line of the cylindrical mirror and thereby, the angle can be adjusted securely without inclining the generating line of the cylindrical mirror when the angle is adjusted.

Moreover, according to the aforementioned mirror supporting structure, only the securing member 16 is secured the angle attitude of the cylindrical mirror 5 has reached to the certain degree, so that the end portion of the cylindrical mirror 5 at the securing member 16 side does not rotate even if the other rotary supporting member 13 is minutely rotated. Due to that, the inclination of the generating line of the cylindrical mirror 5 can be corrected by the aforementioned procedure even if the generating line of the cylindrical mirror 5 is inclined from the datum line.

Accordingly, one end portion of the cylindrical mirror can be minutely rotated while securing the other end portion thereof and the inclination of the generating line of the cylindrical mirror can be corrected assuredly even if the generating line of the cylindrical mirror itself is inclined.

BRIEF DESCRIPTION OF THE DRAWINGS

FIG. 1a is an explanatory drawing illustrating an outline of a raster scanner of the present invention and FIG. 1b is an explanatory drawing illustrating a mirror supporting structure of a raster scanner to which the present invention is applied and a method for adjusting mirror angle using the same;

FIGS. 6a and 6b are front and plan views of the cylindrical mirror sub-assembly;

FIG. 7 is an explanatory drawing illustrating a positioning structure of a movable base;

FIG. 8 is an explanatory drawing illustrating a positioning state of the movable base;

FIG. 12 is an explanatory drawing illustrating a state of change of a mirror surface when the inclination of the generating line of the cylindrical mirror is corrected by the mirror support;

FIG. 21 is an explanatory drawing illustrating one example of a mirror supporting structure of the prior art raster scanner.

DETAILED DESCRIPTION OF PREFERRED EMBODIMENT

Figure 1B:
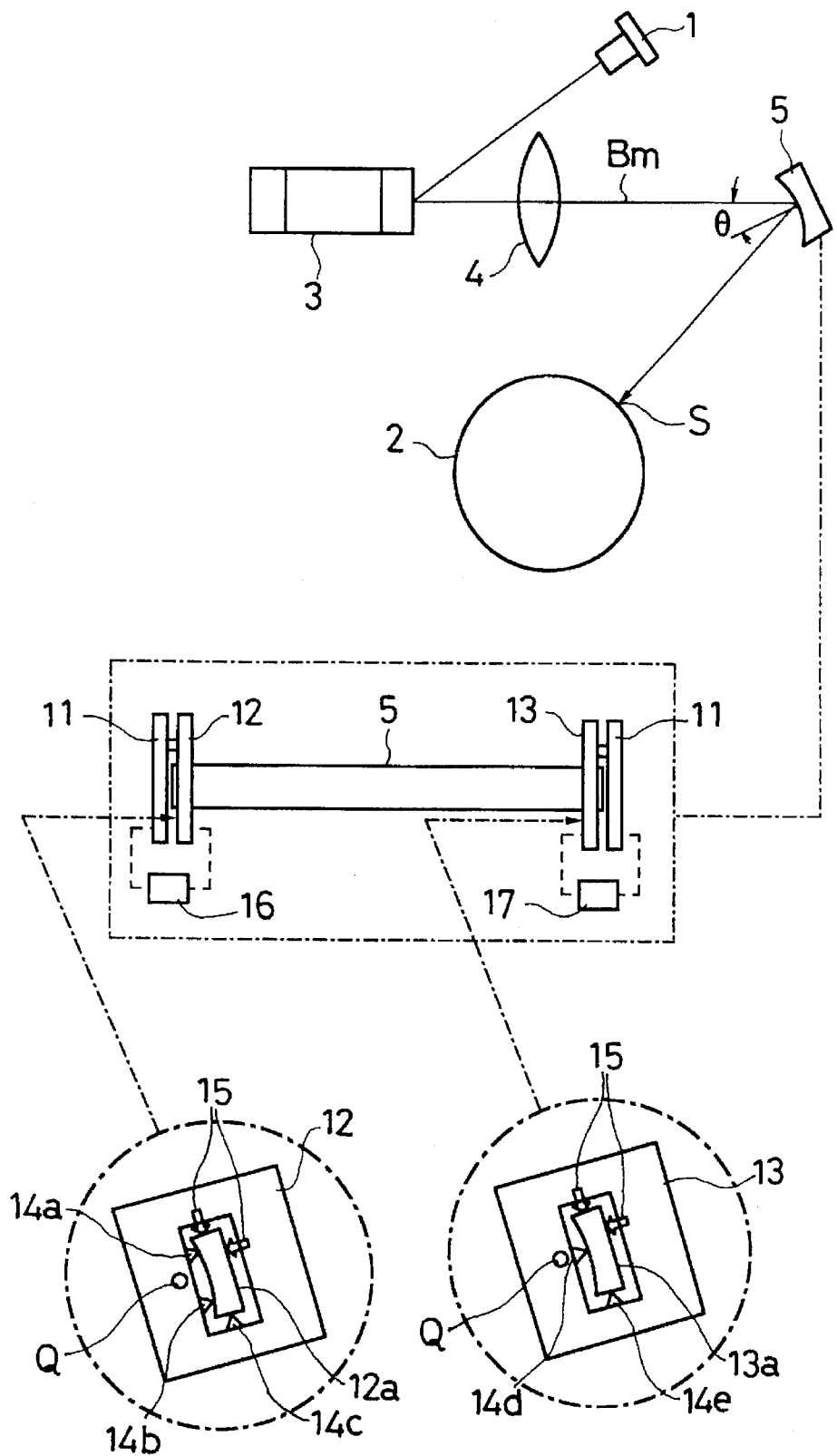

Based now on the preferred embodiments shown in the drawings, the present invention will be explained in detail.

Figure 2:
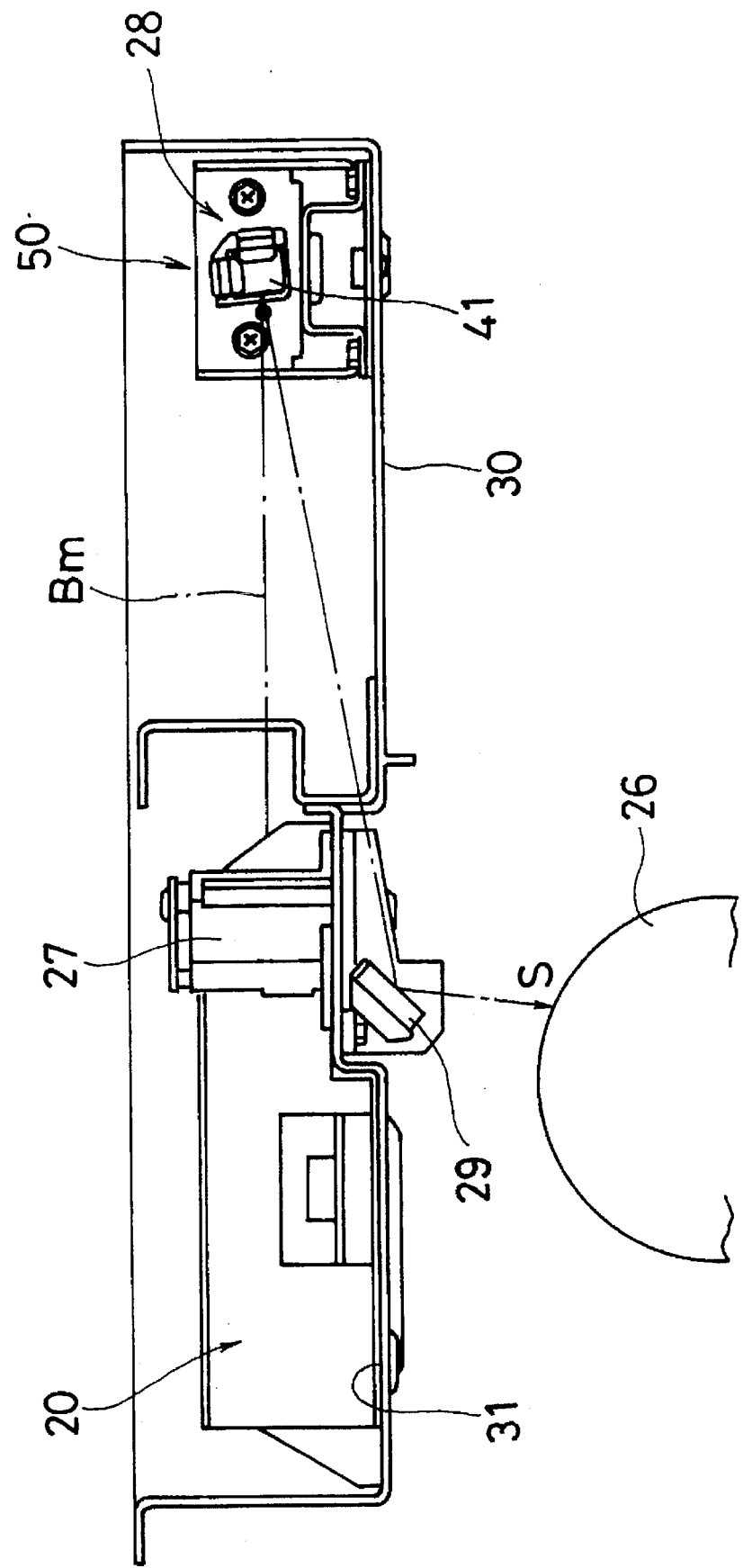
FIG. 2 is a front explanatory drawing illustrating one embodiment of a laser scanner to which the present invention is applied.
Figure 3:
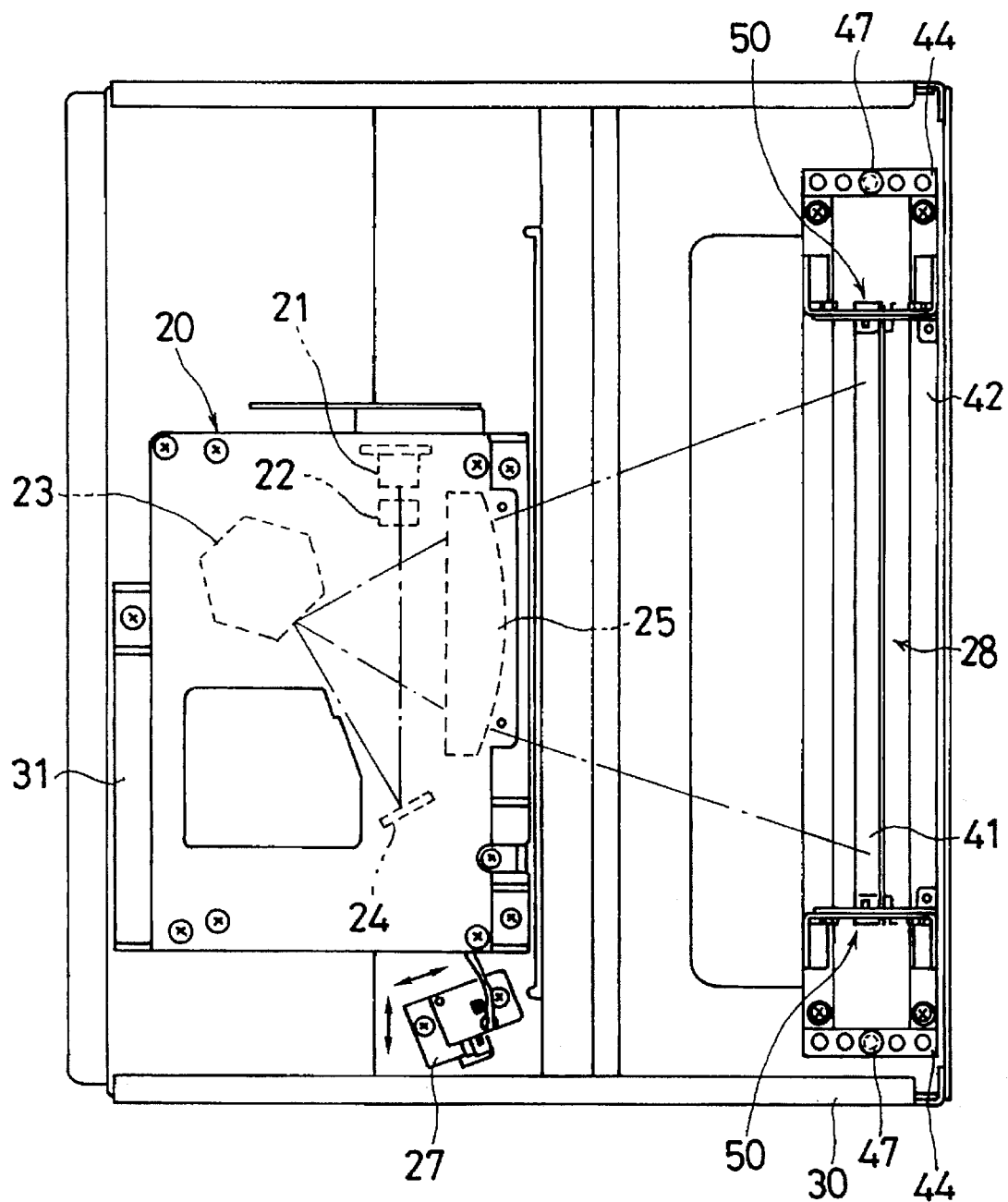
FIG. 3 is a plan view of FIG. 2.

FIGS. 2 and 3 show one embodiment of a laser scanner to which the present invention is applied. In the figures, an optical sub-assembly 20 is mounted in a certain region of an optical frame 30. This optical sub-assembly 20 disposes a semiconductor laser 21 which irradiates beam Bm in accordance to image signals, a collimator lens 22 for shaping the beam Bm from the semiconductor laser 21 into parallel beam, a polygon mirror 23 for deflecting the beam Bm from the collimator lens 22 across a certain scan range, a reflecting mirror 24 for reflecting the beam Bm from the collimator lens 22 to the polygon mirror 23 and an imaging lens 25 for imaging the beam Bm deflected by the polygon mirror 23 appropriately on a main scan line S on a photosensitive drum 26 within an optical sub-frame 31 with a certain position relationship.

Figure 4:
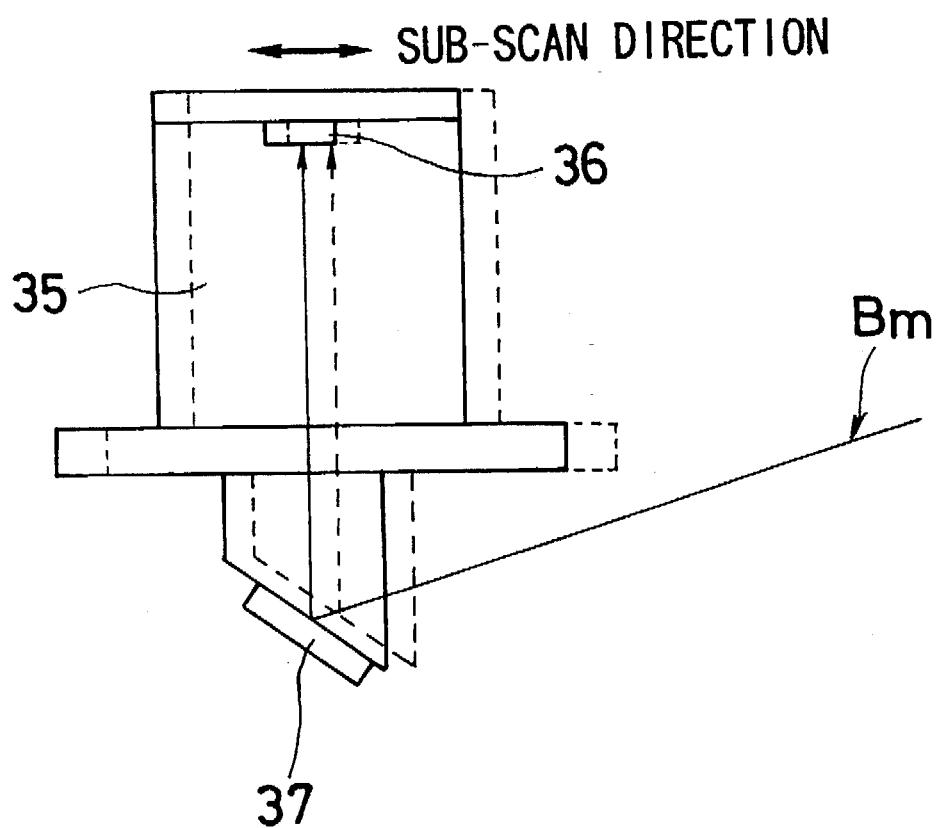
FIG. 4 is an explanatory drawing illustrating a structural example of a synchronizing signal detector unit.

Moreover, a synchronizing signal detector unit 27 for detecting image-writing starting position of actual scanning range on the photosensitive drum 26 is disposed near the optical sub-assembly 20. This synchronizing signal detecting unit 27 is movable in two directions as shown by arrows in FIG. 3 and can adjust position of the photosensitive drum 26 in the main scan and sub-scan directions within one plane. More concretely, the synchronizing signal detector unit 27 is what, as shown in FIG. 4, a photosensor 36 is disposed in a region above an unit frame 35 and a reflecting mirror 37 is disposed in a region below the unit frame 35 to guide the beam Bm from the optical sub-assembly 20 to the photosensor 36 through the reflecting mirror 37. It allows to adjust the position of the beam Bm to the photosensor 36 in the sub-scan direction by moving the position of the unit frame 35 against the optical frame 30 from that of solid line to dotted line in the direction equivalent to the sub-scan direction of the photosensitive drum 26. Furthermore, the position of the beam Bm to the photosensor 36 in the main scan direction can be adjusted by moving the position of the unit frame 35 against the optical frame 30 appropriately in the direction of main scan direction that is orthogonal to the sub-scan direction.

Moreover, in this embodiment, a cylindrical mirror sub-assembly 28 for correcting inclination of a mirror surface of the polygon mirror 23 is disposed on the optical frame 30 and the beam Bm from the cylindrical mirror sub-assembly 28 is irradiated out of the optical frame 30 through an opening (not shown) opened on the optical frame 30 to guide onto the main scan line S on the photosensitive drum 26 through a reflecting mirror 29 disposed at the back side of the optical frame 30.

Figure 5:
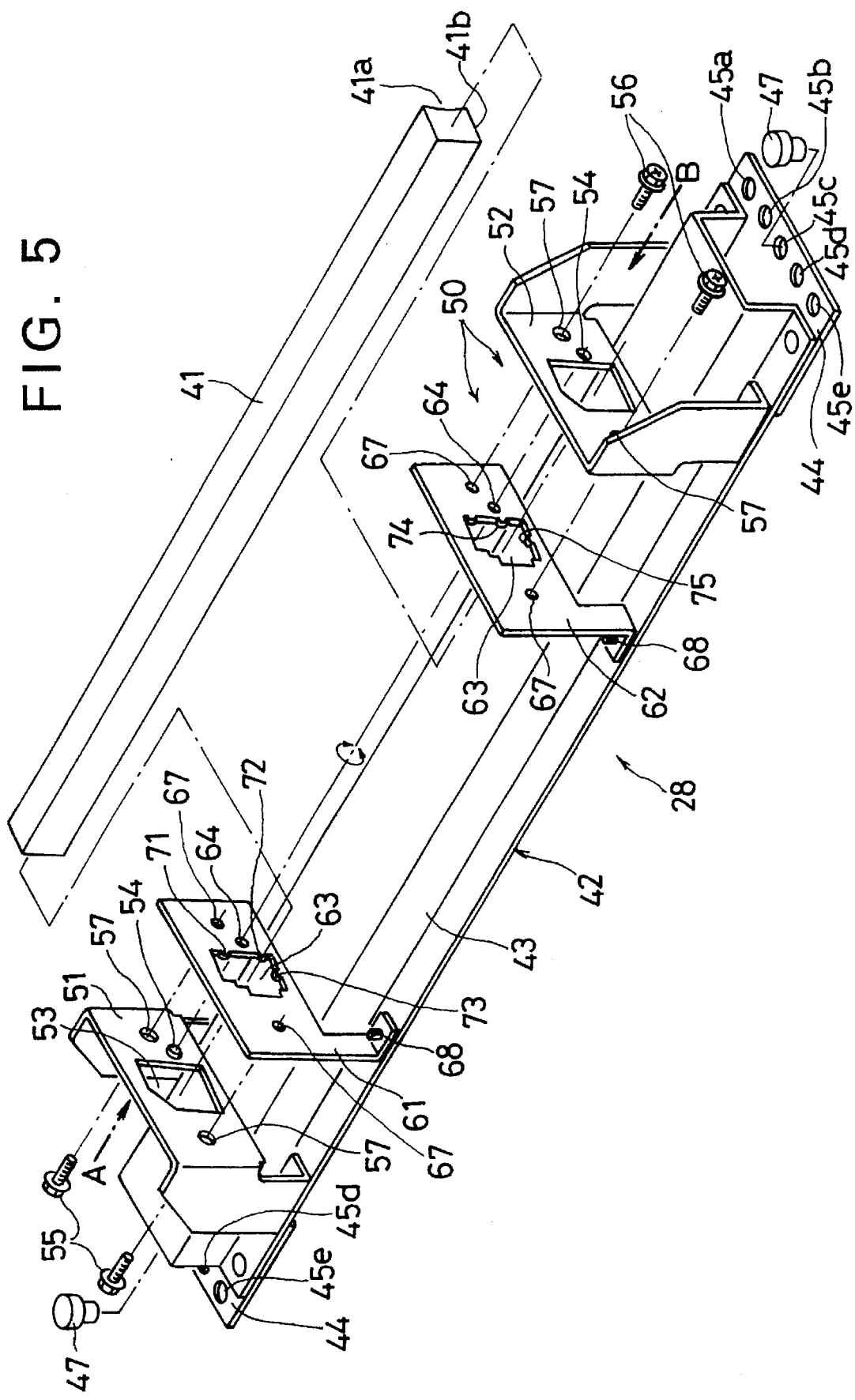
FIG. 5 is an exploded perspective view of a cylindrical mirror sub-assembly.

FIGS. 5 and 6 show a concrete structure of the cylindrical mirror sub-assembly 28 (referred to as a "mirror sub-assembly" hereinafter in the section of the preferred embodiments).

In the figures, the mirror sub-assembly 28 is comprised of a cylindrical mirror 41, a movable base 42 which is capable of moving in the incident beam direction of the cylindrical mirror 41 and mirror supports 50 which are provided on the movable base 42 and support the cylindrical mirror 41 in a manner capable of adjusting its angle.

More concretely, the movable base 42 is what positioning plates 44 are secured at both ends of a rigid channel member 43 having a cross section similar to hat-shape. On each positioning plate 44, as specifically shown in FIG. 7, a plurality of positioning holes 45a through 45e (five holes in this embodiment) are opened along the incident beam direction of the cylindrical mirror 41 in interval of, for example, every L–X (mm) and on regions of the optical frame 30 that correspond to each positioning plate 44, on the other hand, a plurality of frame side positioning holes 46a through 46e (five holes in this embodiment) are opened along the incident beam direction of the cylindrical mirror 41 in interval of, for example, every L (mm).

Then, as shown in FIG. 8, the position of the movable base 42 is moved step by step along the incident beam direction of the cylindrical mirror 41 by inserting positioning pins 47 to a certain positioning hole 45a through 45e of the positioning plate 44 and to a certain frame side positioning hole 46a through 46e. In this embodiment, a state as shown in FIG. 8c is created when the positioning pin 47 is inserted to the positioning hole 45c and the frame side positioning hole 46c, and the movable base 42 moves forward and backward by 2 X from the state of FIG. 8c as shown by FIGS. 8a and 8e when the positioning pin 47 is inserted to the positioning holes 45a and 45e and to the frame side positioning holes 46a and 46e. The movable base 42 also moves forward and backward by X from the state of FIG. 8c as shown by FIGS. 8b and 8d when the positioning pin 47 is inserted to the positioning holes 45b and 45d and the frame side positioning holes 46b and 46d. At this time, the both ends of the movable base 42 move the same distance, so that the moving direction of the movable base 42 does not deviate from the incident beam direction of the cylindrical mirror 41. By the way, it is obvious that symmetrical position in the positioning plates 44 at the right and left has to be selected in inserting the positioning pin 47.

The mirror support 50 is also provided with, as shown in FIGS. 5 and 9, a pair of fixed plates 51 and 52 which are secured on the both sides of the movable base 42 in the longitudinal direction and rotary supporting plates 61 and 62 which are rotatably attached inside of the fixed plates 51 and 52 facing each other for supporting the cylindrical mirror 41.

More concretely, mirror inserting holes 53 for inserting and allocating both end portions of the cylindrical mirror 41 are opened in the center of the fixed plates 51 and 52 and a rotating boss 54 as a rotation supporting shaft is created in the region near each mirror inserting hole 53. The rotating boss 54 provides a center of rotation which is parallel to the generating line of the cylindrical mirror 41. Moreover, a pair of screw inserting holes 57 which are larger than securing screws 55 and 56 are opened respectively at both sides of the mirror inserting hole 53 of each fixed plate 51 and 52.

On the other hand, a mirror inserting hole 63 for inserting and allocating the both end portions of the cylindrical mirror 41 is opened in the center of each rotary supporting plate 61 and 62 and an engaging hole 64 for rotatably engaging the rotating boss 54 is opened at a corresponding place with the rotating boss 54. Moreover, a pair of screw holes 67 that mate with the securing screws 55 and 56 are created on the both sides of the mirror inserting hole 63 of each rotary supporting plate 61 and 62. An adjusting screw 68 is also provided at the lower end portion of the rotary supporting plates 61 and 62, which is distant from the center of rotation, in a manner capable of being bolted downwardly. The tip side of the adjusting screw 68 is disposed so as to abut to the surface of the movable base 42. Therefore, the rotary supporting plates 61 and 62 are minutely rotated around the center of rotation in accordance to indentation of the adjusting screw 68 by bolting it appropriately.

Then, within the edge of the mirror inserting hole 63 of one of the rotary supporting plate 61, supporting projections 71 and 72 for supporting a reflecting surface 41a of the cylindrical mirror 41 at two points are created at a place facing to the reflecting surface 41a and a supporting projection 73 for supporting the bottom side surface 41b that is orthogonal to the reflecting surface 41a of the cylindrical mirror 41 at one point is created at a place facing to the bottom side surface 41b. Moreover, within the edge of the mirror inserting hole 63 of the other rotary supporting plate 62, a supporting projection 74 for supporting the reflecting surface 41a of the cylindrical mirror 41 at one point is created at a place facing to the reflecting surface 41a and a supporting projection 75 for supporting the bottom side surface 41b that is orthogonal to the reflecting surface 41a of the cylindrical mirror 41 at one point is created at a place facing to the the bottom side surface 41b. Furthermore, as shown in FIGS. 6a, 6b and FIGS. 9a (corresponds to a view seen in the direction of the arrow A in FIG. 5) and 9b (corresponds to a view seen in the direction of the arrow B in FIG. 5), plate springs 76 through 79 for urging the cylindrical mirror 41 to each supporting projections 71 through 75 are mounted at the edge of the mirror inserting hole of each rotary supporting plate 61 and 62.

Next, a method for adjusting the angle of the cylindrical mirror 41 by the mirror support 50 will be explained.

Figure 9A:
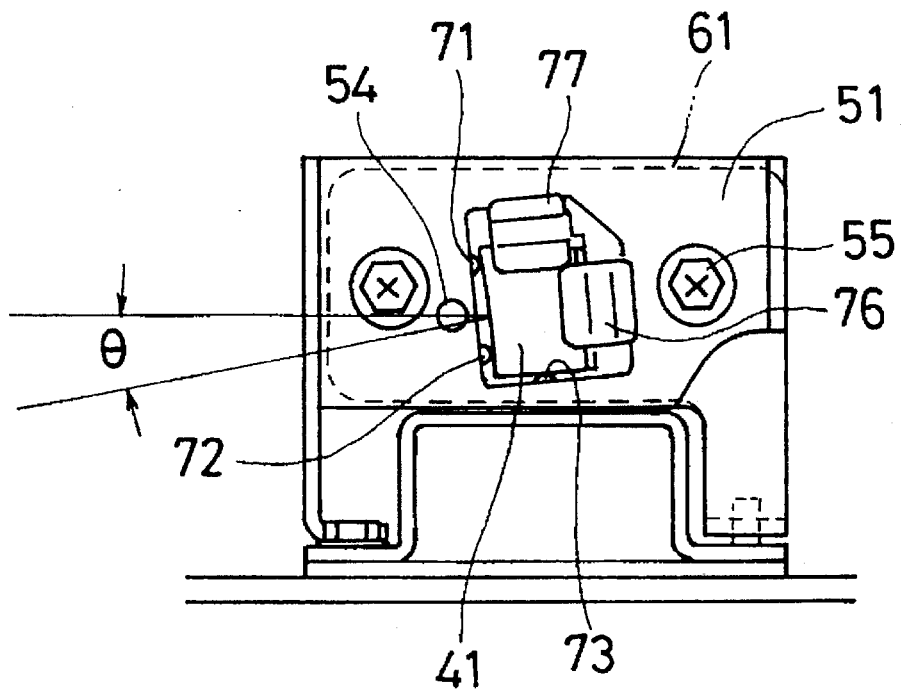
FIG. 9 is an explanatory drawing illustrating a mirror support.
Figure 9B:
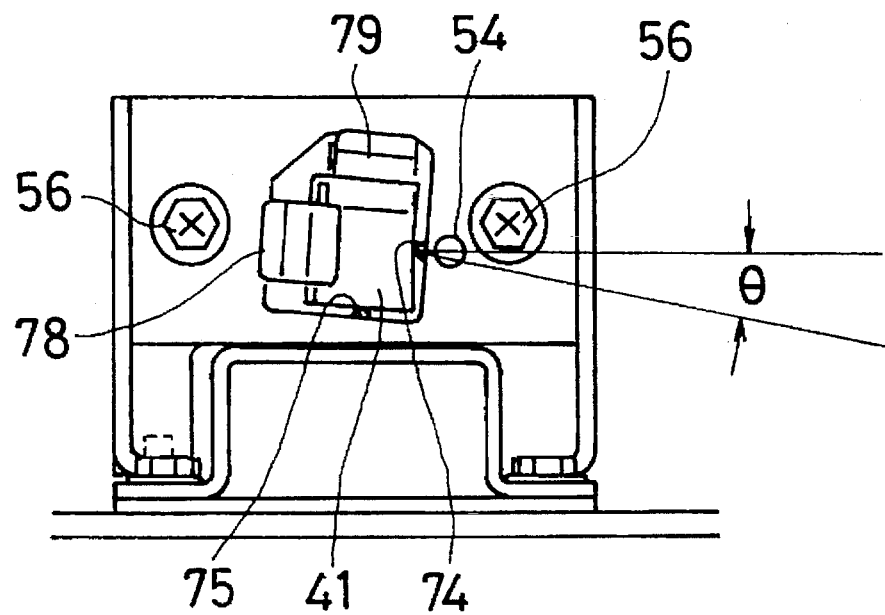

Now if the angle of the cylindrical mirror 41 is changed by θ as shown in FIGS. 9a and 9b, each securing screw 55 and 56 is once loosened to be able to rotate the rotary supporting plates 61 and 62.

Figure 10A:
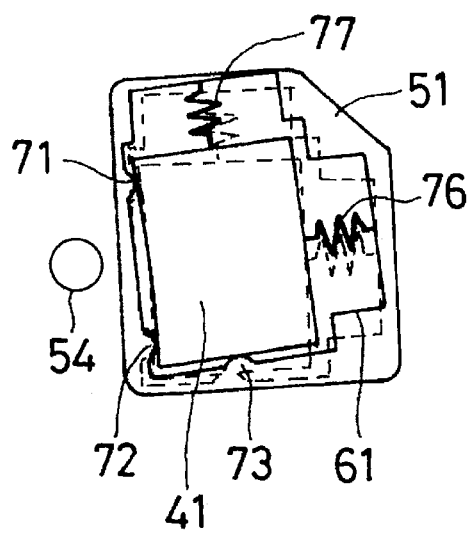
FIG. 10 is an explanatory drawing illustrating a state in which angle of the cylindrical mirror is adjusted by the mirror support.
Figure 10B:
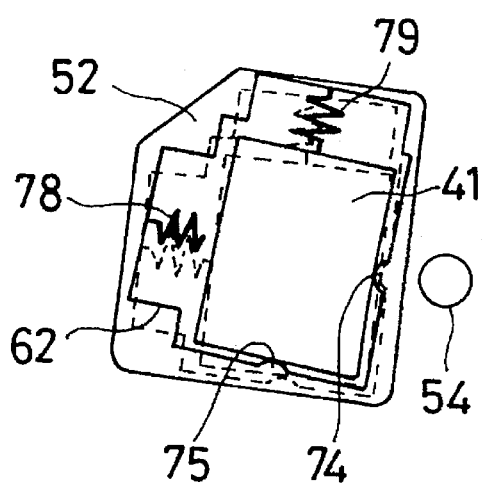

In this state, as shown in FIG. 9a, when the rotary supporting plate 61 side is rotated by θ by rotating appropriately the adjusting screw 68 of the rotary supporting plate 61 side, one end of the cylindrical mirror 41 rotates and moves from the state of dotted line to that of solid line following to the rotary supporting plate 61 as shown in FIG. 10a. At this time, the rotary supporting plate 62 is also in a state capable of rotating as shown in FIG. 10b, so that the other end of the cylindrical mirror 41 also rotates and moves by θ in one body with the rotary supporting plate 62 following to the rotation and movement of the one end of the cylindrical mirror 41.

If only the securing screws 55 and 56 are fastened in this stage, the cylindrical mirror 41 is now set in the position where it, as a whole, has rotated and moved by θ.

In order to evaluate the performance for adjusting the angle of the cylindrical mirror 41 of this embodiment, a comparative example which had the same structure with that of the embodiment in terms of one side of the mirror support 50 (the rotary supporting plate 61 side) and which had no rotary supporting plate 62 and was provided with supporting projections 74 and 75 and plate springs 78 and 79 at the mirror inserting hole 53 of the fixed plate 52 in terms of the other side (the rotary supporting plate 62 side) was prepared, and the mirror angle adjustment implemented on the embodiment was similarly implemented on the comparative example.

Figure 14A:
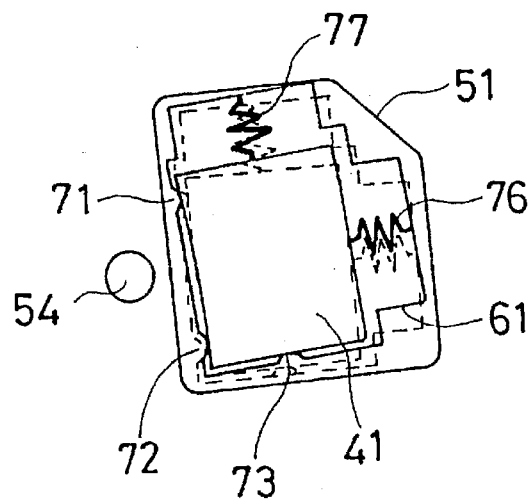
FIGS. 14a to 14c are explanatory drawings illustrating angle adjusting states of the cylindrical mirror by the mirror support of the comparative example.
Figure 14B:
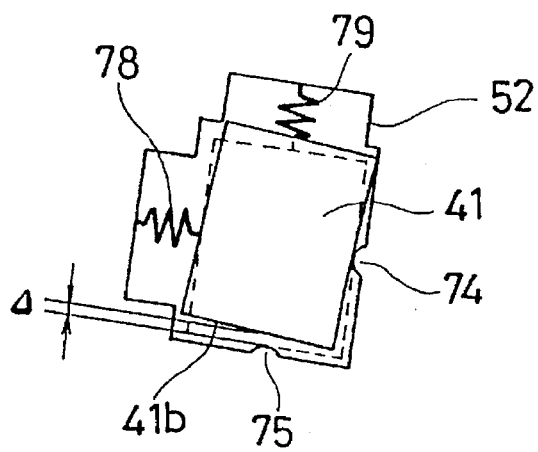
Figure 14C:
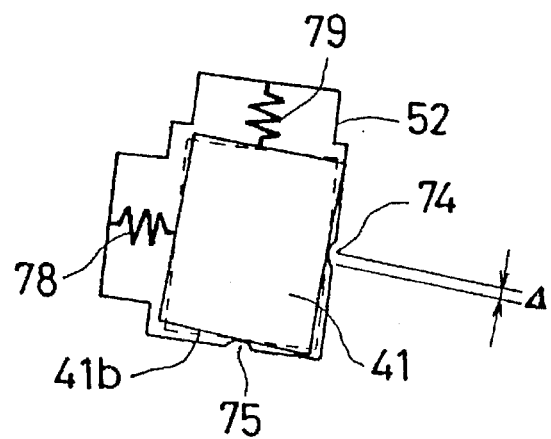

In the aforementioned comparative example, when one of the rotary supporting plate 61 is rotated appropriately to rotate and move one end of the cylindrical mirror 41 from the state shown by the dotted line to that shown by the solid line as shown in FIG. 14a, the other end of the cylindrical mirror 41 also rotates and moves at first from the state shown by the dotted line to that shown by the solid line following to the rotation and movement of the one end as shown in FIG. 14b. At this time, if it is assumed that the bottom side surface of the other end side of the cylindrical mirror 41b rises up from the supporting projection 75 by Δ, the cylindrical mirror 41 is urged to the bottom side of the other side by urging force of the plate spring 79, the other end side of the cylindrical mirror 41 moves downwardly until the bottom side surface 41b at the other end side of the cylindrical mirror 41 abuts to the supporting projection 75 and thereby the generating line of the other end side of the cylindrical mirror 41 deviates downward by Δ. This means that the generating line of the cylindrical mirror 41 is inclined and supports the fact that the performance for adjusting the angle of the mirror by the comparative example is not favorable and the one by the present embodiment is better.

Furthermore, according to the present embodiment, the inclination of the generating line can be corrected even if the generating line of the cylindrical mirror 41 itself is inclined due to production precision of the cylindrical mirror 41. The followings are its concrete correcting procedures.

Figure 11A:
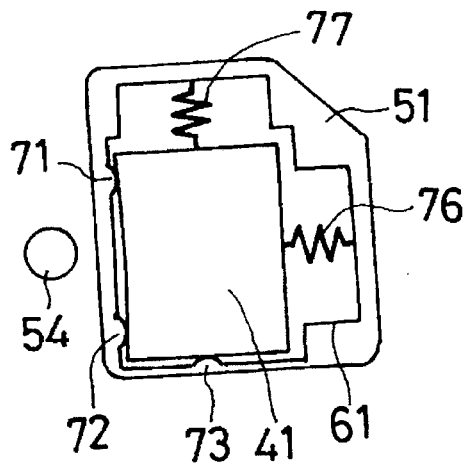
FIG. 11 is an explanatory drawing illustrating a state in which inclination of generating line of the cylindrical mirror is corrected by the mirror support.
Figure 11B:
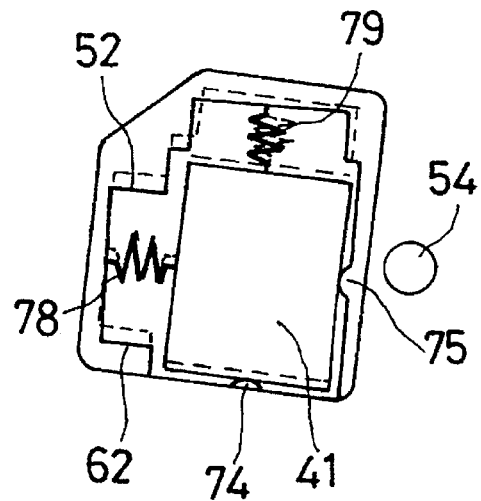
Figure 13A:
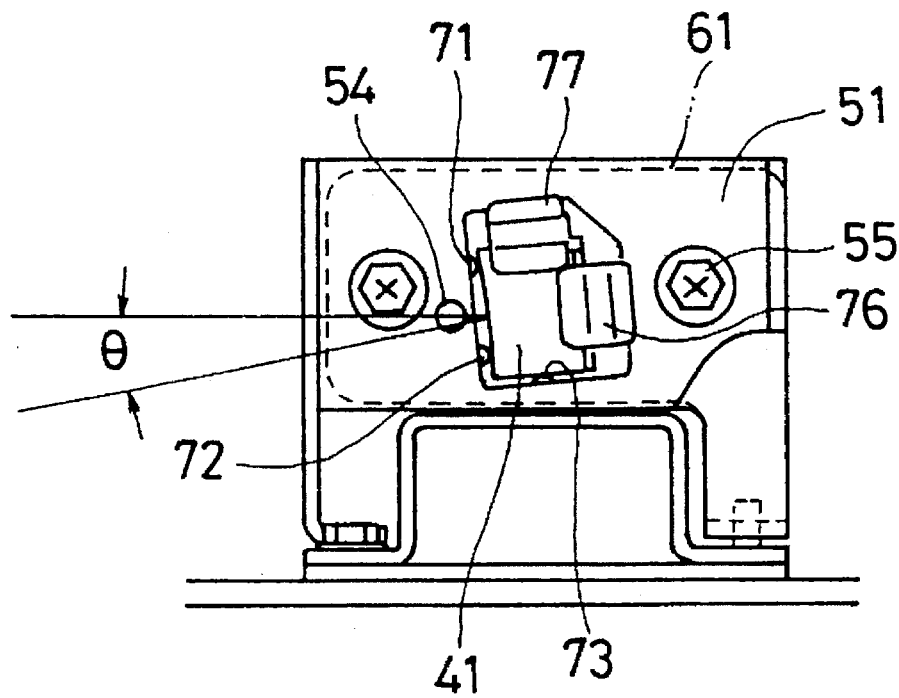
FIGS. 13a and 13b are explanatory drawings illustrating examples of a mirror support of a comparative example.
Figure 13B:
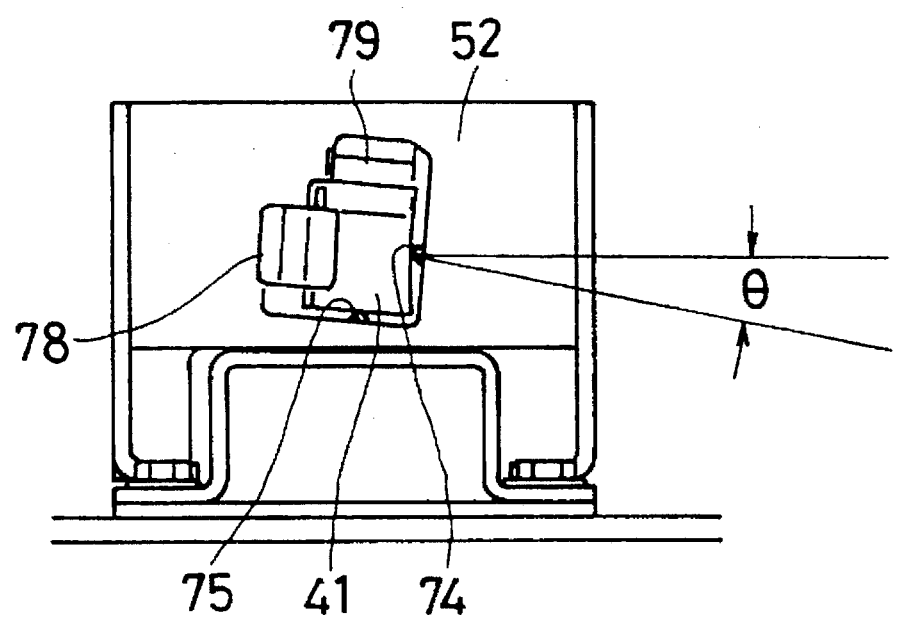

If the generating line of the cylindrical mirror 41 is found to be inclining when the angle of the mirror has been adjusted as described above, only one securing screw 56 is loosened to allow the rotary supporting plate 62 to be rotated and moved and then the adjusting screw 68 is adjusted appropriately to rotate the rotary supporting plate 62 by degree of the inclination to be corrected to correct the inclination of the generating line of the cylindrical mirror 41 as shown in FIG. 11b.

At this time, as shown in FIG. 11a, the rotary supporting plate 61 is in a state being secured to the fixed plate 51 by the securing screw 55 at one side (the rotary supporting plate 61 side) of the mirror support 50 and the movement of the cylindrical mirror 41 in the rotation direction is restrained because the reflecting surface of the cylindrical mirror 41 is abutting to two supporting projections 71 and 72. Accordingly, one side of the cylindrical mirror 41 does not move following to the movement of the other side even if such minute rotational movement as the correction of the inclination of the generating line is caused on the other side, so that the inclination of the generating line of the cylindrical mirror 41 is assuredly corrected.

In a strict sense, the angle of the reflecting surface 41 of the cylindrical mirror 41 changes at the rotary supporting plate 61 side which is structured to support at two points as shown in FIGS. 12a and 12b, radius of curvature of the cylindrical mirror 41 normally used for laser printer and others is fully large, a span between the rotary supporting plates 61 and 62 is fully longer than the two-point support span and the correction of the inclination of the generating line is very small, so that an error δ of the reflecting surface 41a is extremely small and causes no trouble in actual adjustment.

Figure 15A:
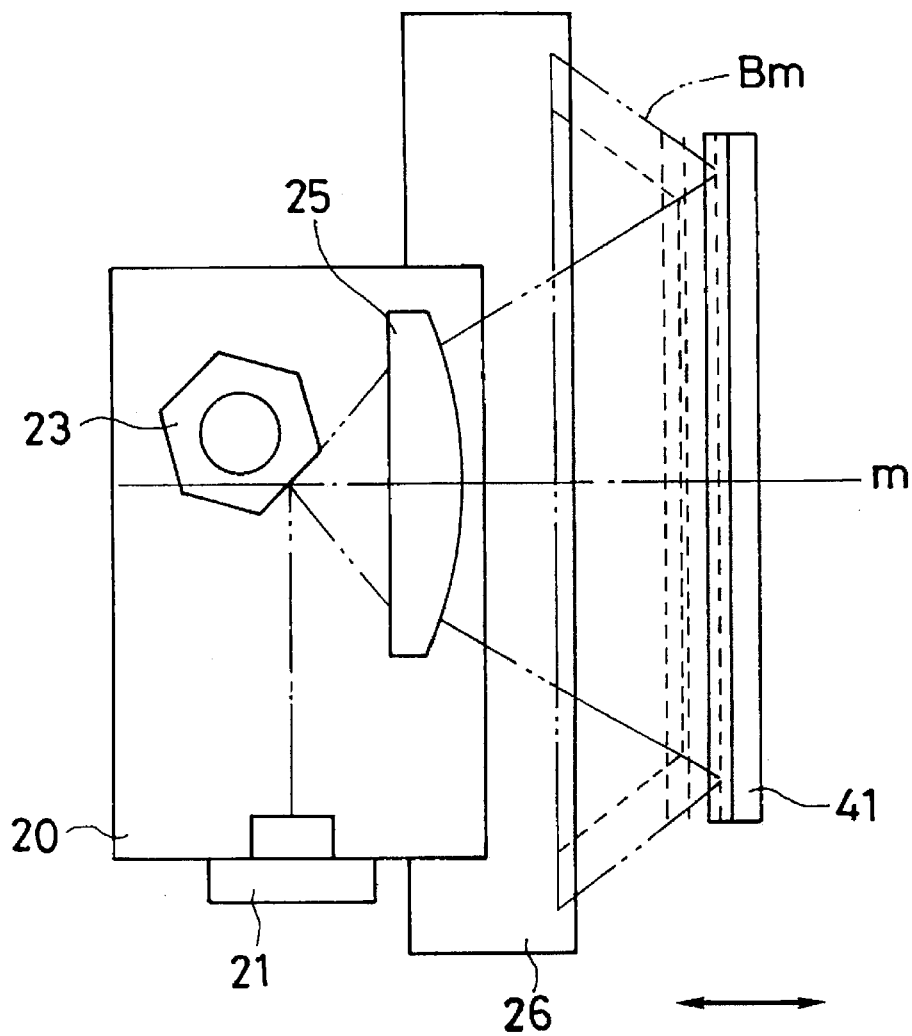
FIG. 15 is an explanatory drawing typically illustrating optical path and angle adjusting states by the cylindrical mirror of the embodiment.
Figure 15B:
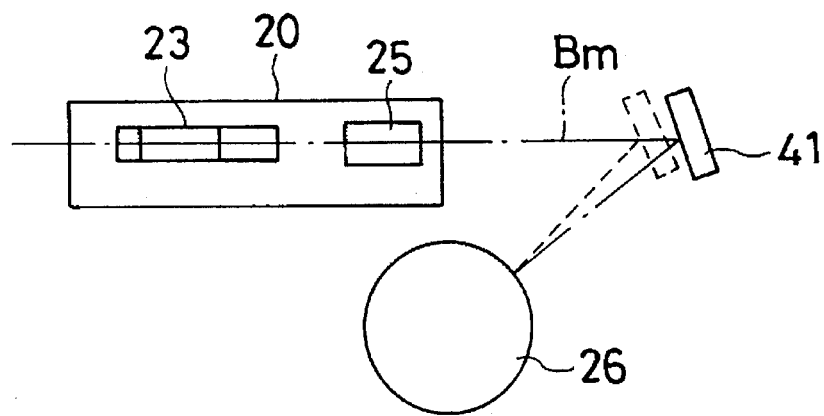

Accordingly, with this embodiment, the position of the cylindrical mirror 41 along the incident beam direction can be changed by changing the position of the movable base 42 by the aforementioned procedures and thereby, the length of the optical path from the polygon mirror 23 or the imaging lens 25 to the photosensitive drum 26 can be variably adjusted without changing the output beam direction, as shown in FIGS. 15a and 15b.

Also the angle of the cylindrical mirror 41 can be adjusted and its generating line can be corrected by adjusting the mirror support 50 by the aforementioned procedures, so that latent image can be written appropriately on the main scan line S on the photosensitive drum 26, as shown in FIGS. 15a and 15b.

Figure 16:
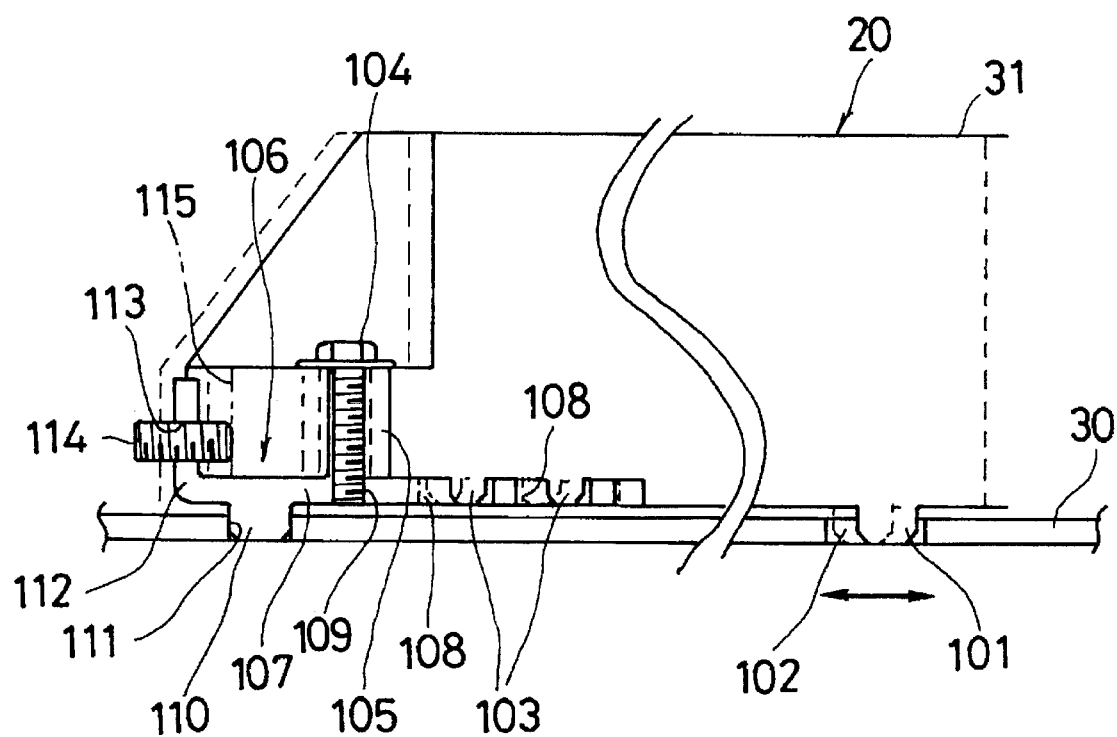
FIG. 16 is an explanatory drawing illustrating a position adjusting mechanism of an optical sub-frame.
Figure 17:
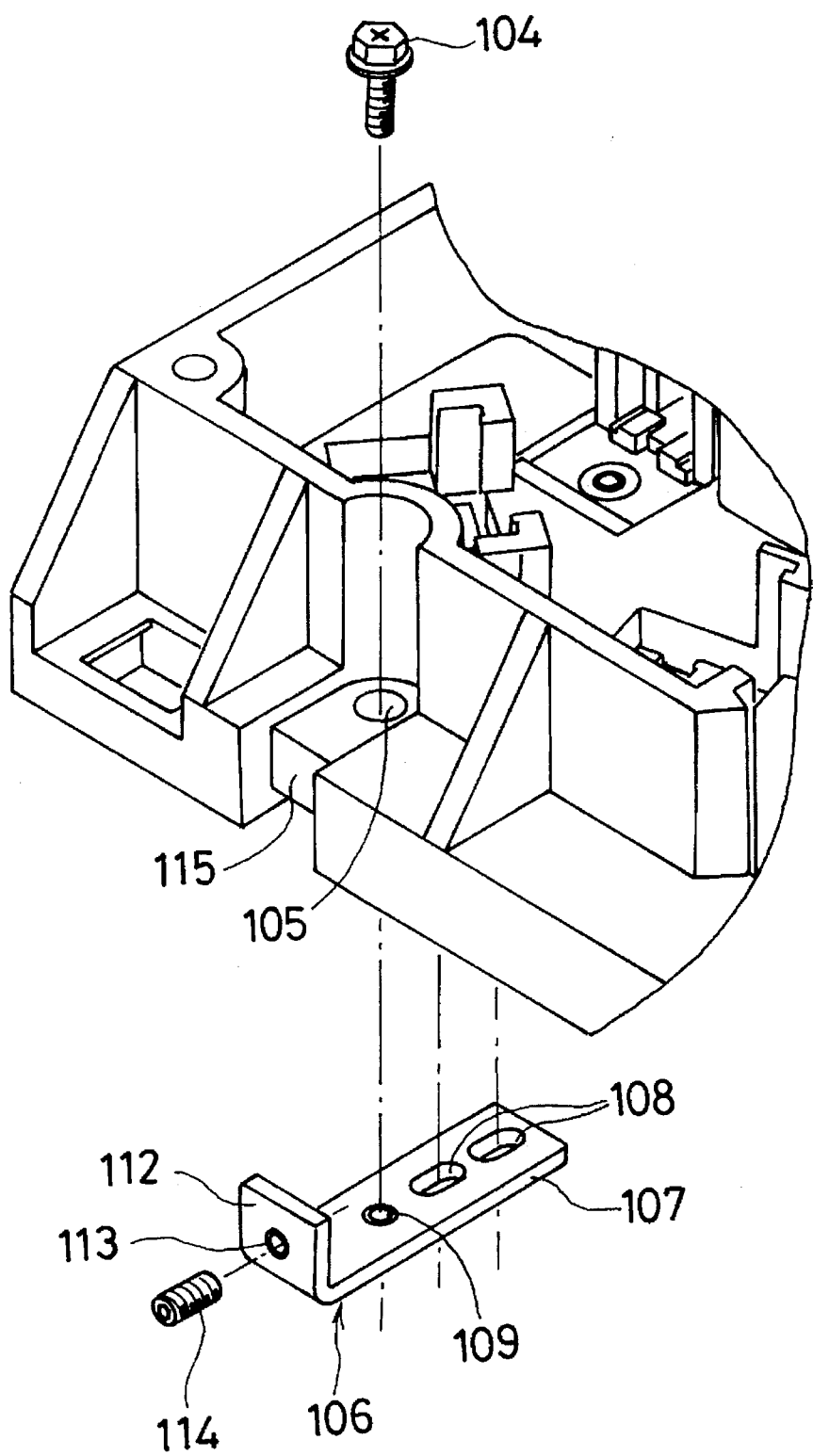
FIG. 17 is an explanatory drawing illustrating the main part of the position adjusting mechanism of the optical sub-frame.
Figure 18:
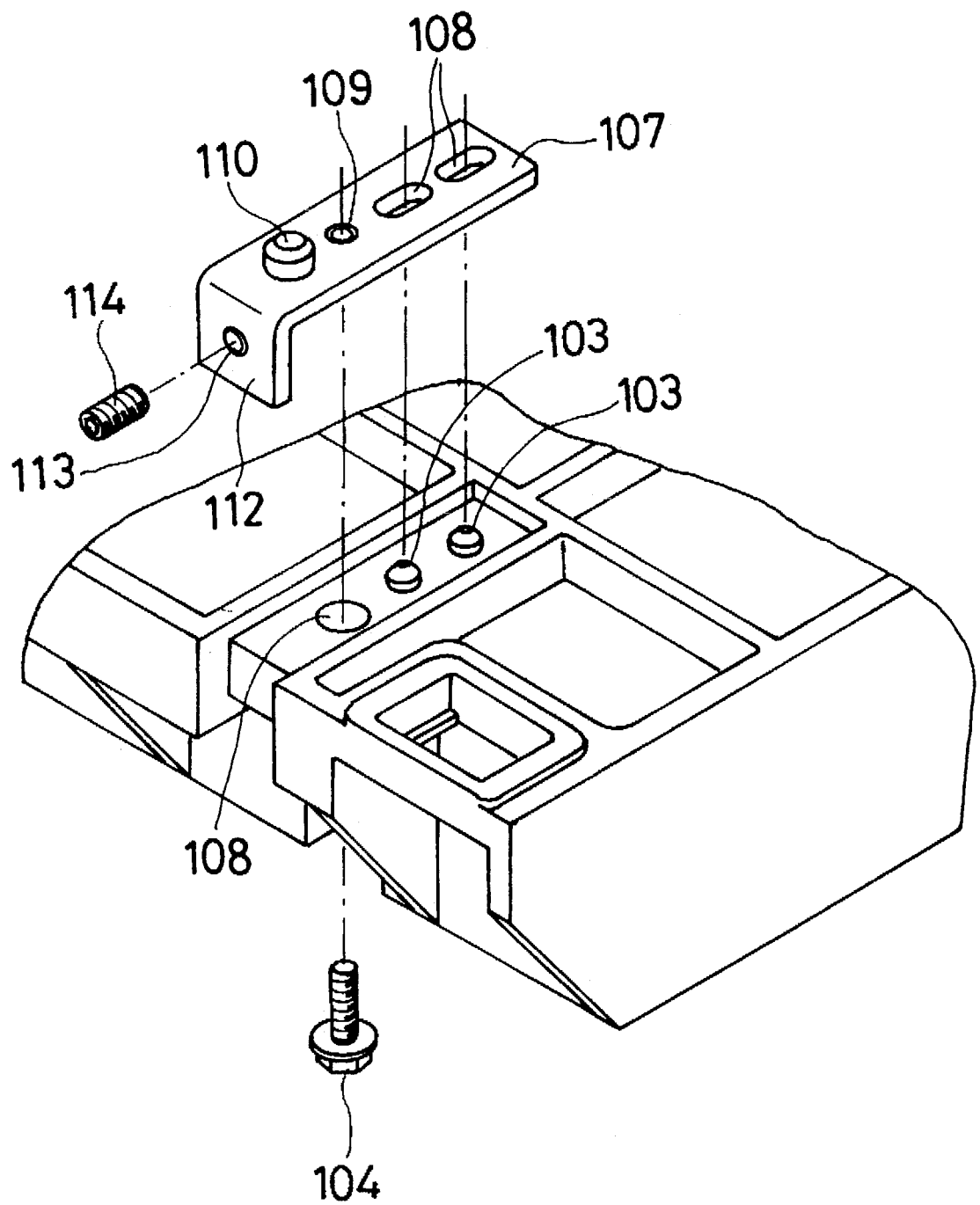
FIG. 18 is a view seen in the direction of the bottom of FIG. 17.

Furthermore, the optical sub-assembly 20 is moved and adjusted along the output beam direction with this embodiment. More concretely, as shown in FIGS. 16 through 18, a position regulating pin 101 in the output beam direction is provided at one side of the back of the optical sub-frame 31 of the optical sub-assembly 20. The pin is slidably engaged with a long hole 102 that extends in the output beam direction on the optical frame 30. Two position regulating pins 103 that are arrayed in the output beam direction are provided at the other side of the back of the optical sub-frame 31 and a screw inserting hole 105 for inserting a temporary fastening screw 104 is opened in line with those pins 103.

Moreover, a position adjusting plate 106 is interposed between the optical sub-frame 31 and the optical frame 30. A horizontal portion 107 is formed in long L-shape on the position adjusting plate 106 and on the horizontal portion 107, a long hole 108 that extends in the output beam direction to engage with the position regulating pin 103 is created and a screw hole 109 for mating with the temporary fastening screw 104 corresponding to the screw inserting hole 105 is created. Furthermore, a positioning pin 110 is provided on the back of the horizontal portion 107 and a positioning hole 111 that engages with the positioning pin 110 is opened on the optical frame 30. On the other hand, a screw hole 113 for mating with the adjusting screw 114 is created on a vertical portion 112 of the position adjusting plate 106. A stopper wall 115 that faces to the vertical portion 112 and abuts to the tip of the adjusting screw 114 is created on the optical sub-frame 31.

Next, a state of the optical sub-frame 31 being mounted will be explained. The position adjusting plate 106 is temporary assembled to the optical sub-frame 31 by the temporary fastening screw 104 and in this state, the position regulating pin 101 of the optical sub-frame 31 is engaged to the long hole 102 of the optical frame 30 and the positioning pin 110 of the position adjusting plate 106 is engaged to the positioning hole 111 of the optical frame 30.

If the adjusting screw 114 is rotated appropriately in this stage and is gradually screwed in (because the adjusting screw 114 is abutting to the stopper wall 115), the optical sub-frame 31 moves while its position being regulated in the beam irradiating direction. The optical sub-frame 31 is positioned to a certain position by fastening the temporary fastening screw 104 tightly when the optical sub-frame 31 reaches to the certain position. Then the mounting of the optical sub-frame 31 is completed by securing the optical sub-frame 31 to the optical frame 30 using a securing screw (not shown).

Figure 19A:
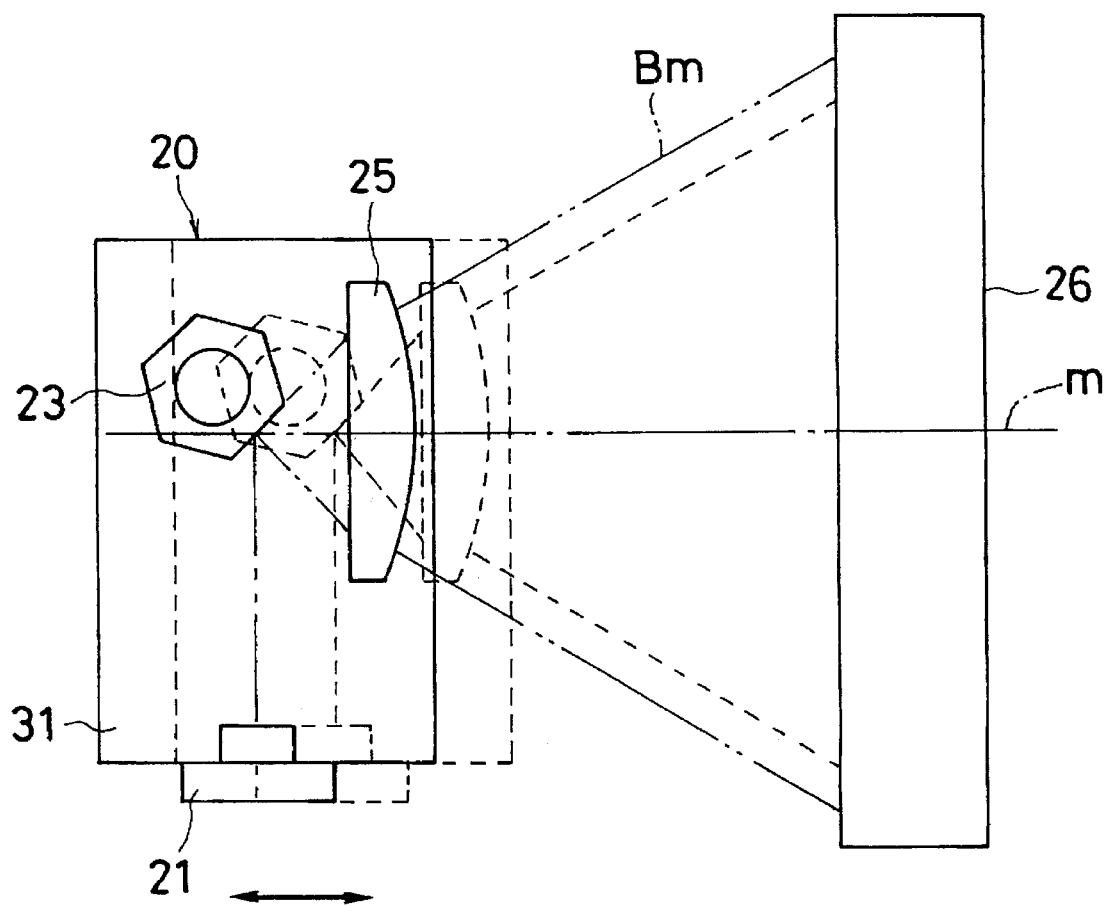
FIG. 19 is an explanatory drawing typically illustrating a state in which an optical path is adjusted by the optical sub-frame of the embodiment.
Figure 19B:
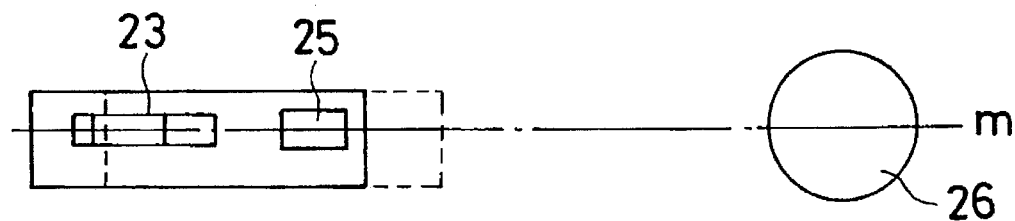
Figure 20A:
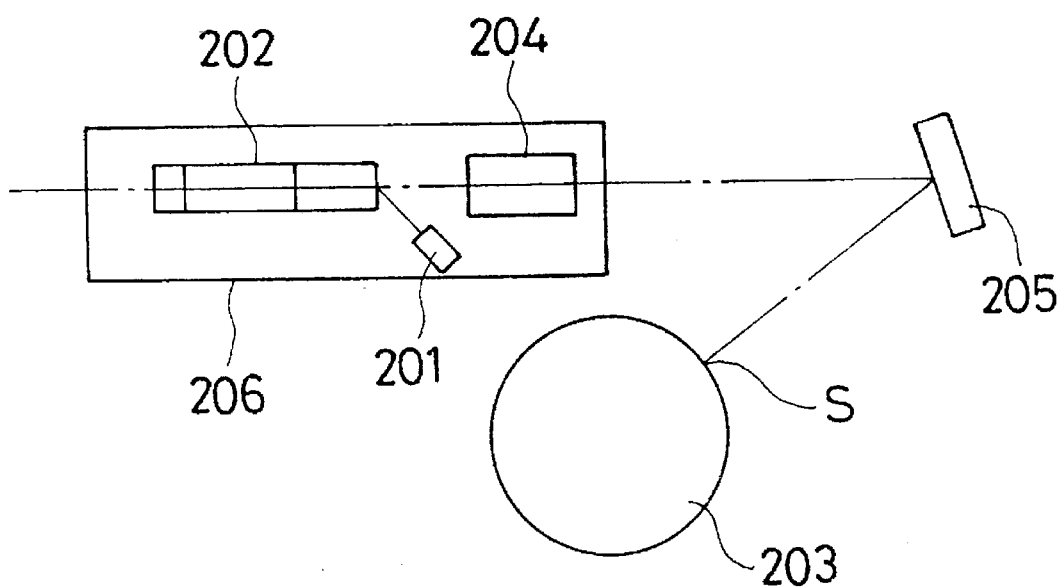
FIGS. 20a and 20b are front and plan views illustrating one example of a prior art raster scanner.
Figure 20B:
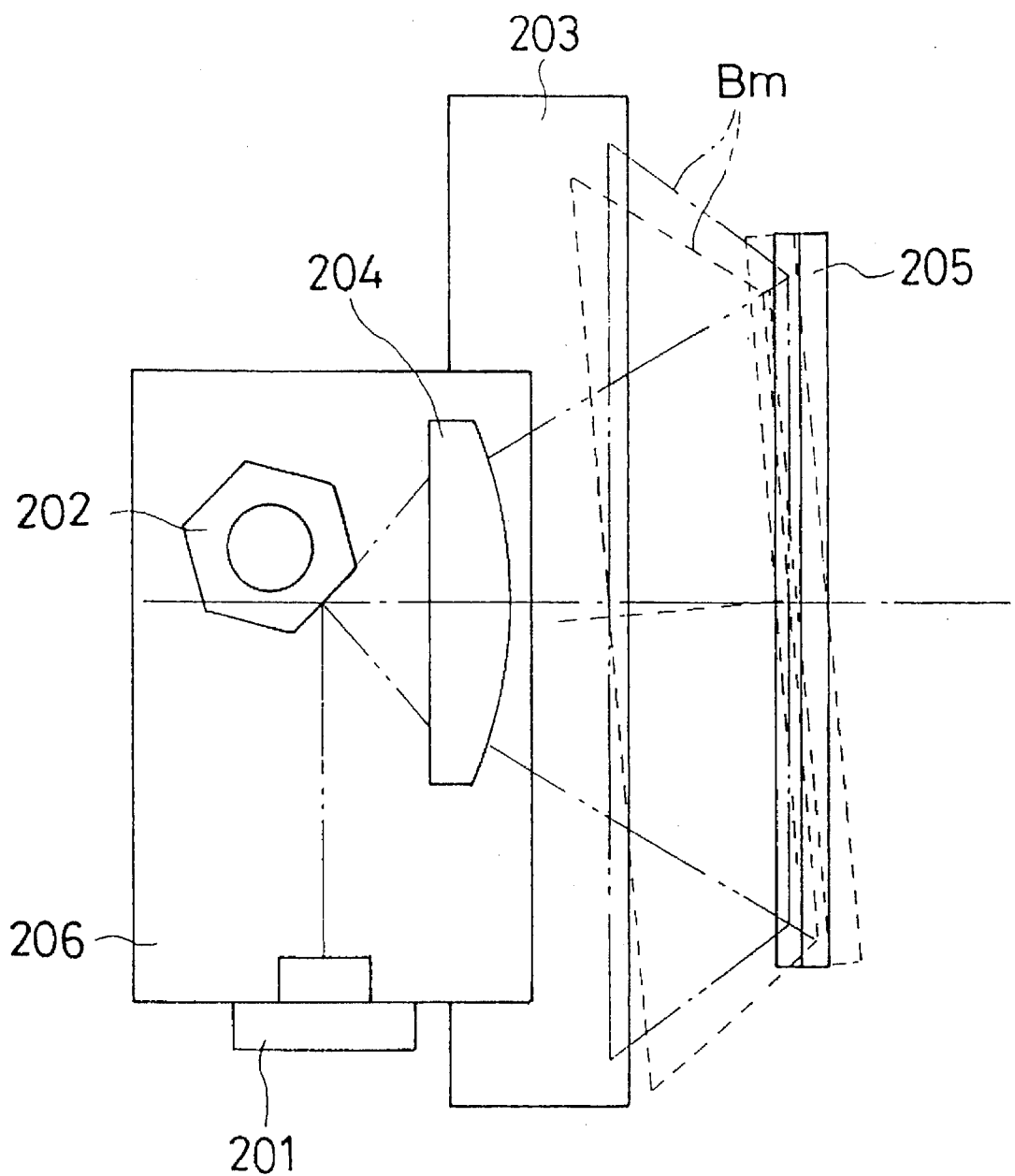

In this embodiment, therefore, the optical sub-frame 31 can be moved along the beam output direction m by rotating and manipulating the adjusting screw 114 appropriately as shown in FIGS. 19a and 19b and thereby, the length of the optical path from the polygon mirror 23 or the imaging lens 25 to the photosensitive drum 26 can be variably set.

What is claimed is:

1. A raster scanner, comprising;

a beam generating means for generating a beam in accordance with image signals;

a beam deflecting means for deflecting and scanning said beam from said beam generating means;

an imaging lens for imaging said beam deflected by said beam deflecting means;

at least one reflecting mirror for regulating an optical path between said imaging lens and a photosensitizer and for reflecting said beam imaged by said imaging lens onto said photosensitizer;

an optical frame for positioning said beam generating means, said beam reflecting means, said imaging lens, and said at least one reflecting mirror;

a first movable mechanism supporting said reflecting mirror for movement along an incident optical path while maintaining said reflecting mirror in a certain angle attitude; and a second movable supporting mechanism for supporting an optical sub-frame provided for mounting said beam generating means, said beam deflecting means, and said imaging lens for movement along an output optical path while being maintained in a certain angle attitude.

2. A raster scanner according to claim 1, wherein said movable supporting mechanism of said at least one reflecting mirror is comprised of a long movable member for supporting said reflecting mirror in a manner capable of moving in the incident beam direction, positioning plates which are provided at both ends of said movable member in the direction that is orthogonal to the incident beam direction and on which a plurality of positioning holes are opened in every certain interval, a plurality of frame side positioning holes opened on said optical frame which corresponds to said positioning plates and are disposed in every certain interval which slightly differs from the interval of each positioning hole of said positioning plates, and positioning pins that engage with arbitrary positioning hole of said positioning plates and said frame side positioning hole that correspond thereto.

3. A raster scanner according to claim 1, wherein said movable supporting mechanism of said optical sub-frame is comprised of a plurality of position regulating pins provided on the back of said optical sub-frame along the output optical axis direction, a position regulating long hole that extends along the output optical axis direction on the optical frame side and slidably receives said position regulating pins, a fine position adjusting mechanism for minutely moving said optical sub-frame along the output optical axis direction and a stopper for positioning and securing said optical sub-frame finely adjusted by said fine position adjusting mechanism at an arbitrary position.

4. A raster scanner according to claim 1, wherein said at least one reflecting mirror is a cylindrical mirror for correcting inclination of a deflecting surface of said beam deflecting means, by being interposed between said beam deflecting means and said photosensitizer.

5. The raster scanner according to claim 46, further comprising a mirror angle adjusting means for rotating said cylindrical mirror about an axis parallel to a generating line of said cylindrical mirror.

6. The raster scanner according to claim 5, wherein said mirror angle adjusting means comprises:

a pair of rotary members mounted on fixed frames having a center of rotation parallel to the generating line of said cylindrical mirror, each rotary member rotatably supporting an end of said cylindrical mirror;

first projections located in one of the rotary members for supporting two points of a reflecting surface of said cylindrical mirror and for supporting a bottom surface of said cylindrical mirror;

second projections located in another of the rotary members for supporting a single point of the reflecting surface of said cylindrical mirror and for supporting a bottom surface of said cylindrical mirror;

elastic members for pressing each surface to be supported onto said first and second projections; and securing members for securing each rotary member to said fixed frame when said cylindrical mirror is at a desired angle.

7. A method for adjusting a mirror angle of a cylindrical mirror used in a raster scanner comprising the steps of:

securing a first rotary member supporting one end of the cylindrical mirror to a fixed frame by securing members after rotating the first rotary member to a desired angle position, causing a generating line of said cylindrical mirror to agree with a datum line by minutely rotating a second rotary member supporting another end of the cylindrical mirror if the generating line of said cylindrical mirror is inclined from the datum line and securing said second rotary supporting member to said fixed frame by securing members.

8. A raster scanner, comprising:

a beam generating means for generating a beam in accordance with image signals;

a beam deflecting means for deflecting and scanning said beam from said beam generating means;

an imaging lens for imaging said beam deflected by said beam deflecting means;

at least one reflecting mirror for regulating an optical path between said imaging lens and a photosensitizer and for reflecting said beam imaged by said imaging lens onto said photosensitizer;

an optical frame for positioning said beam generating means, said beam deflecting means, said imaging lens and said at least one reflecting mirror; and a movable mechanism for supporting said reflecting mirror for movement along an incident optical path while maintaining said reflecting mirror in a certain angle attitude, wherein said movable supporting mechanism of said at least one reflecting mirror is comprised of a long movable member for supporting said reflecting mirror in a manner capable of moving the incident beam direction, positioning plates which are provided at both ends of said movable member in the direction that is orthogonal to the incident beam direction and on which a plurality of positioning holes are opened in every certain interval, a plurality of frame side positioning holes opened on said optical frame which corresponds to said positioning plates and are disposed in every certain interval which slightly differs from the interval of each positioning hole of said positioning plates, and positioning pins that engage with arbitrary positioning hole of said positioning plates and said frame side positioning hole that correspond thereto.

9. A raster scanner according to claim 8, further comprising a movable mechanism for supporting an optical sub-frame provided for mounting said beam generating means, said beam deflecting means, and said imaging lens for movement along an output optical path with respect to said reflecting mirror being maintained in a certain angle attitude.

10. A raster scanner according to claim 8, wherein said at least one reflecting mirror is a cylindrical mirror positioned between said deflecting means and said photosensitizer for correcting inclination of a deflecting surface of said beam deflecting means.

11. The raster scanner according to claim 10, further comprising a mirror angle adjusting means for rotating said cylindrical mirror about an axis parallel a generating line of said cylindrical mirror.

12. A raster scanner, comprising:

a beam generating means for generating a beam in accordance with image signals;

a beam deflecting means for deflecting and scanning said beam from said beam generating means;

an imaging lens for imaging said beam deflected by said beam deflecting means;

at least one reflecting mirror for regulating an optical path between said imaging lens and a photosensitizer and for reflecting said beam imaged by said imaging lens onto said photosensitizer;

an optical frame for positioning said beam generating means, said beam deflecting means, said imaging lens, and said at least one reflecting mirror; and a movable mechanism for supporting an optical sub-frame provided for mounting said beam generating means, said beam deflecting means, and said imaging lens for movement along an output optical path while being maintained in a certain angle attitude, wherein said movable supporting mechanism of said optical sub-frame is comprised of a plurality of position regulating pins provided on the back of said optical sub-frame along the output optical axis direction, a position regulating long hole that extends along the output optical axis direction on the optical frame side and that slidably engages with said position regulating pins, a fine position adjusting mechanism for minutely moving said optical sub-frame along the output optical axis direction and a stopper for positioning and securing said optical sub-frame finely adjusted by said fine position adjusting mechanism at an arbitrary position.

13. A raster scanner, comprising;

a beam generating means for generating a beam in accordance with image signals;

a beam deflecting means for deflecting and scanning said beam from said beam generating means;

an imaging lens for imaging said beam deflected by said beam deflecting means;

at least one reflecting mirror for regulating an optical path between said imaging lens and a photosensitizer and for reflecting said beam imaged by said imaging lens onto said photosensitizer;

an optical frame for positioning said beam generating means, said beam deflecting means, said imaging lens and said at least one reflecting mirror;

a movable mechanism for supporting an optical sub-frame provided for mounting said beam generating means, said beam deflecting means, and said imaging means for movement along an output optical path while being maintained in a certain angle attitude; and a position adjusting plate for adjusting position between the optical sub-frame and the optical frame;

wherein said movable mechanism of said optical sub-frame is comprised of the position adjustment plate, said position adjusting plate being temporarily assembled to the optical sub-frame so that the optical sub-frame is mounted to the optical frame.

* * * * *

UNITED STATES PATENT AND TRADEMARK OFFICE
CERTIFICATE OF CORRECTION

PATENT NO. : 5,638,189
DATED : June 10, 1997
INVENTOR(S) : Katsuyuki YANAGISAWA

It is certified that error appears in the above-indentified patent and that said Letters Patent is hereby corrected as shown below:

Claim 5, column 12, line 52, "46" should read --4--.

Signed and Sealed this

Twentieth Day of January, 1998

Attest:

BRUCE LEHMAN

Attesting Officer

Commissioner of Patents and Trademarks